US006708289B1

(12) United States Patent
Kudo

(10) Patent No.: US 6,708,289 B1
(45) Date of Patent: Mar. 16, 2004

(54) MICROCOMPUTER, ELECTRONIC EQUIPMENT AND DEBUGGING SYSTEM

(75) Inventor: Makoto Kudo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/486,838

(22) PCT Filed: Mar. 31, 1999

(86) PCT No.: PCT/JP99/01662

§ 371 (c)(1),
(2), (4) Date: May 30, 2000

(30) Foreign Application Priority Data

Mar. 31, 1998 (JP) .......................................... 10-104039

(51) Int. Cl.[7] .............................................. G06F 11/00
(52) U.S. Cl. ......................... 714/28; 711/213; 712/227
(58) Field of Search .............................. 714/28, 29, 34, 714/35, 33; 703/28; 712/227; 711/213

(56) References Cited

U.S. PATENT DOCUMENTS

| | | | | | |
|---|---|---|---|---|---|
| 4,819,234 A | * | 4/1989 | Huber | ......................... | 717/129 |
| 5,126,541 A | * | 6/1992 | Shinagawa | .................. | 235/438 |
| 5,659,679 A | * | 8/1997 | Alpert et al. | ................. | 714/34 |
| 5,951,696 A | * | 9/1999 | Naaseh et al. | ................ | 714/34 |
| 5,978,937 A | * | 11/1999 | Miyamori et al. | ............ | 714/45 |
| 6,249,881 B1 | * | 6/2001 | Porten et al. | ................. | 714/38 |
| 6,347,368 B1 | * | 2/2002 | Harthcock | .................. | 712/227 |
| 6,356,961 B1 | * | 3/2002 | Oprescu-Surcobe | ........... | 710/5 |

FOREIGN PATENT DOCUMENTS

| | | |
|---|---|---|
| JP | 60-72034 | 4/1985 |
| JP | 61-52747 | 3/1986 |
| JP | 1-286030 | 11/1989 |
| JP | 2-186448 | 7/1990 |
| JP | 3-78038 | 4/1991 |

* cited by examiner

Primary Examiner—Robert Beausoliel
Assistant Examiner—Christopher S. McCarthy
(74) Attorney, Agent, or Firm—Oliff & Berridge, PLC

(57) ABSTRACT

An objective is to provide a microcomputer, electronic equipment and debugging system which can more effectively execute the debugging operation. A mini monitor section (14) can perform data transfer between the mini monitor section and a main monitor section (16). Based on the receive data, the mini monitor section (14) performs debugging processing and also executes a jump command to an address at which an initializing program or a writing program for a flash memory (11) is stored. Receive data (or primitive command) includes GO, write, read, external routine jump commands, and send data contains a flag for announcing an error in data writing. The main monitor section (16) converts a debugging command into a primitive command. Receive data also contains a command identifying data. Both the program debugging and rewriting operations can be performed on a single host system (17) in the present invention.

35 Claims, 24 Drawing Sheets

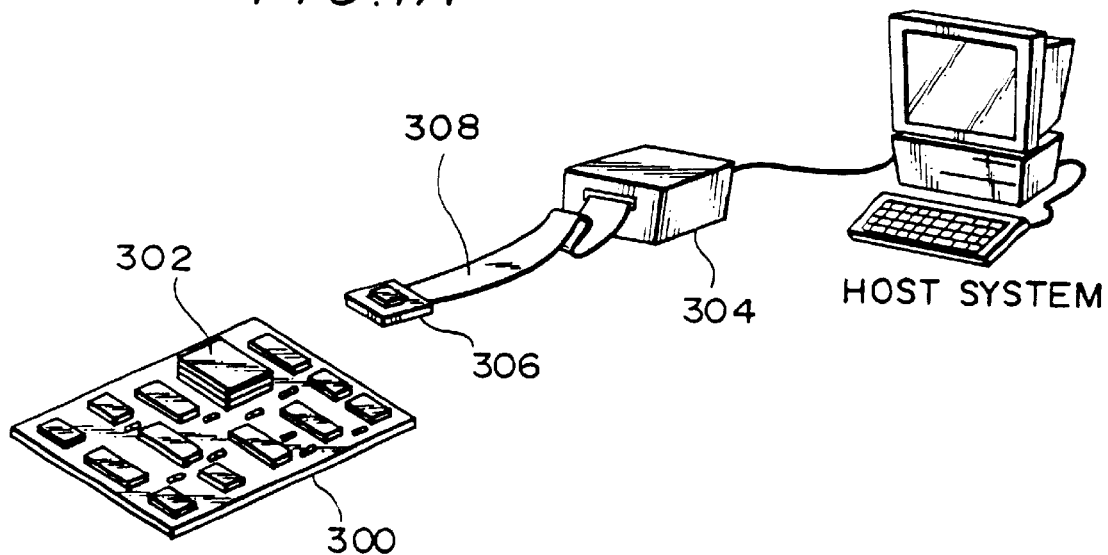
FIG. IA
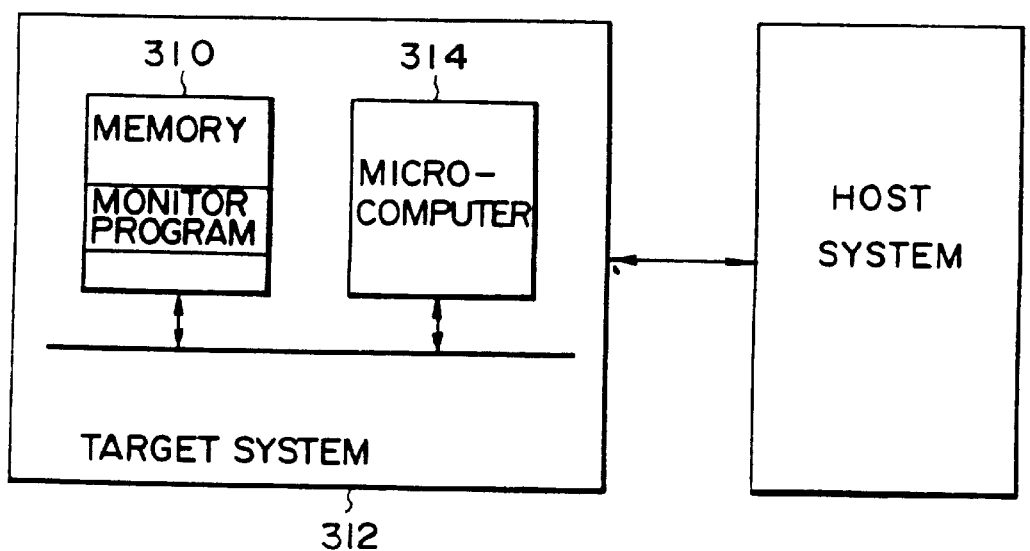
FIG. IB

FIG. 5A
PROGRAM LOAD $\left(\begin{array}{l}\text{8001oh,12 BYTES,ADD---,SUB---}\\\text{AND---,OR---,XOR---,LD.W---}\end{array}\right)$ ⇒ $\left(\begin{array}{l}\text{WRITE(8001oh, ADD---, SUB---)}\\\text{+WRITE(80014h, ADD---, OR---)}\\\text{+WRITE(80018h, XOR---, LD.W---)}\end{array}\right)$

FIG. 5B
STEP EXECUTION ⇒ WRITE TO STEP EXECUTION ENABLE BIT OF CONTROL REGISTER +GO

FIG. 5C
INTERNAL REGISTER READ ⇒ READ MONITOR RAM ON MEMORY MAP

FIG. 5D
BREAKPOINT SETTING ⇒ WRITE TO BREAK ENABLE BIT AND BREAK ADDRESS BIT OF CONTROL REGISTER

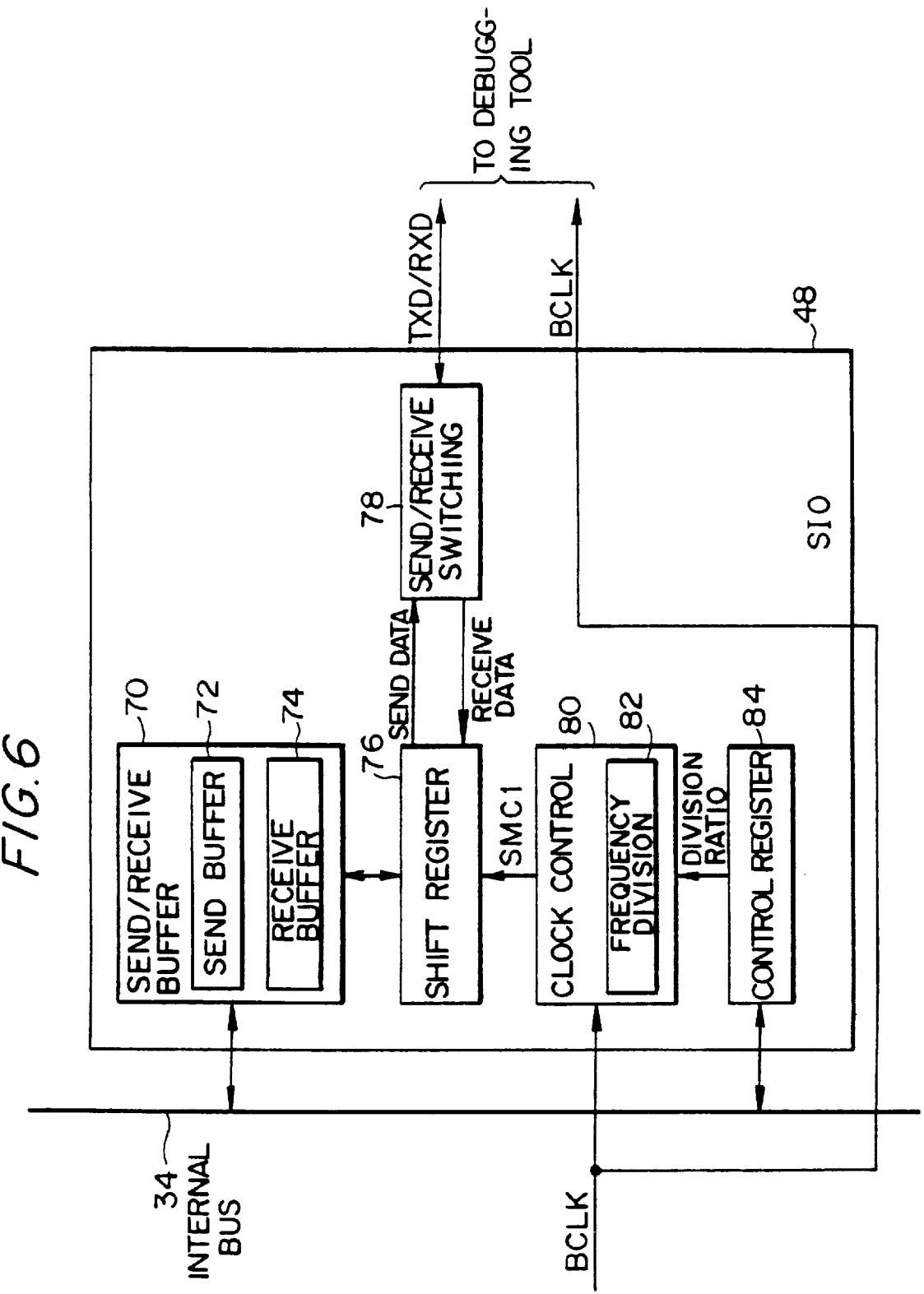

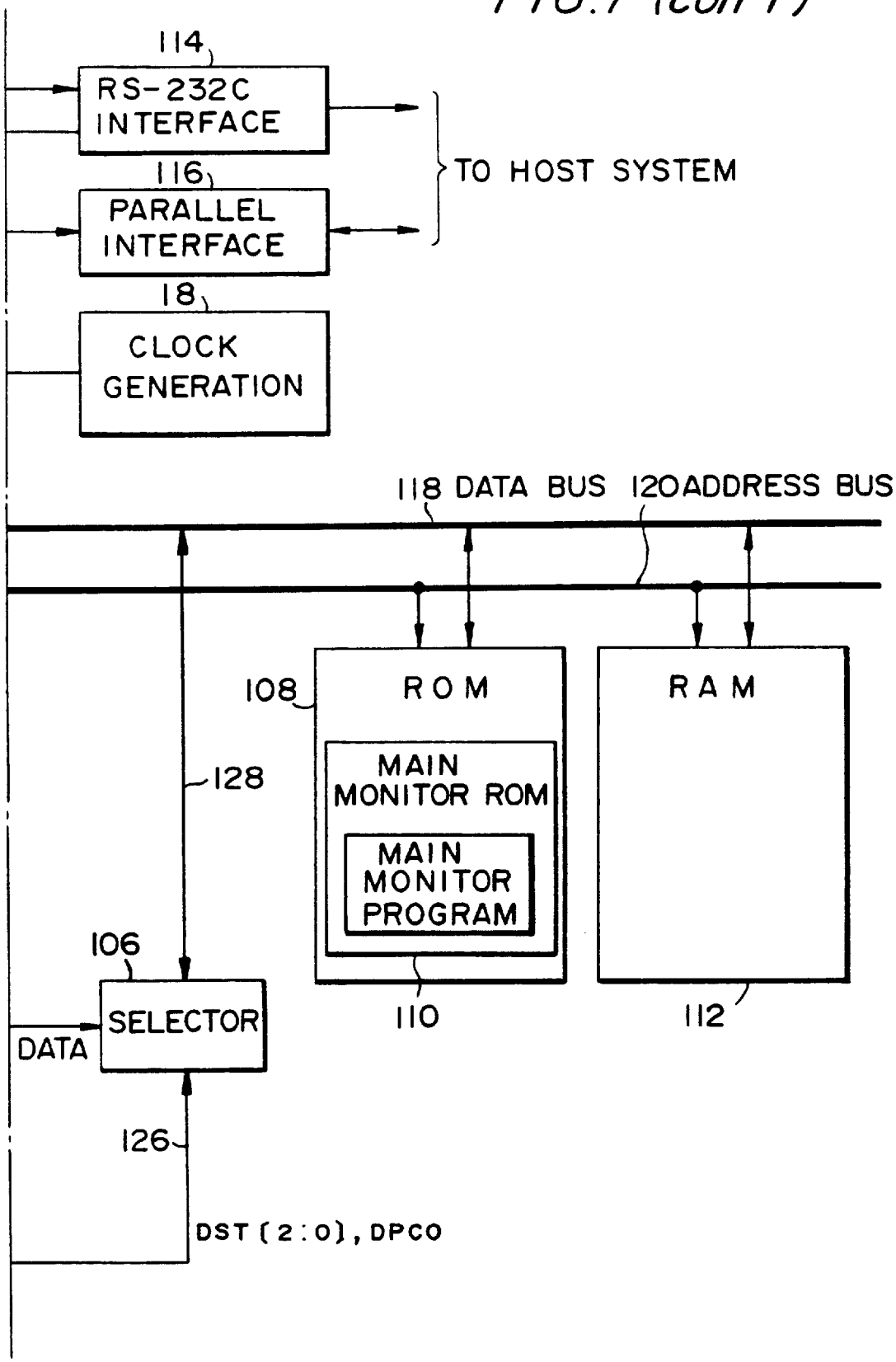
FIG. 7 (con't)

FIG.10A  DATA FORMAT
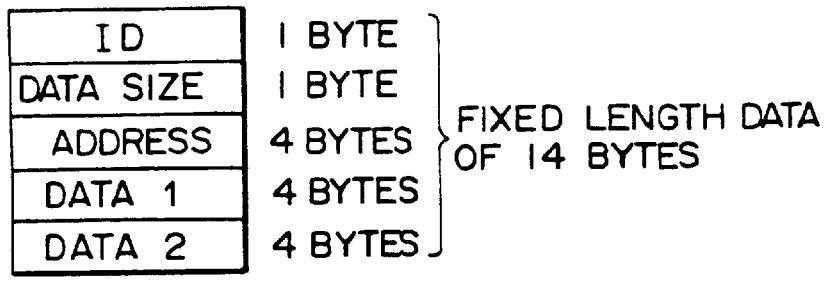
FIG.10B  GO COMMAND
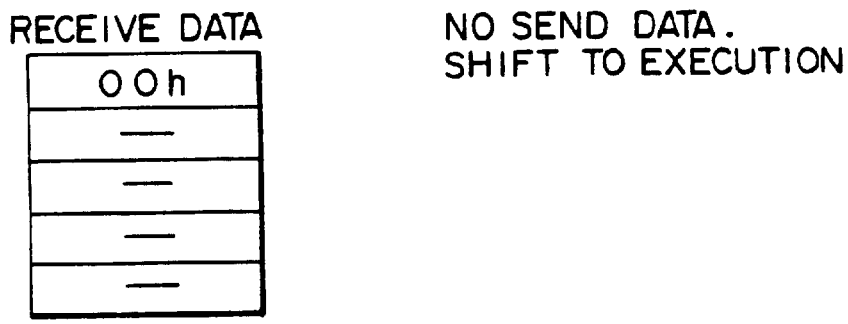
FIG.10C  WRITE COMMAND
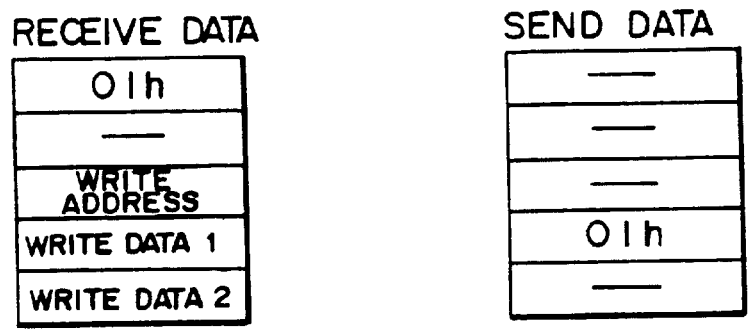
FIG.10D  READ COMMAND
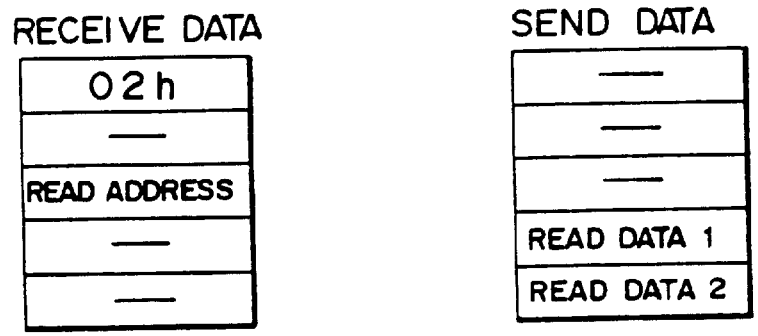

EXTERNAL ROUTINE JUMP COMMAND

DATA FILL COMMAND

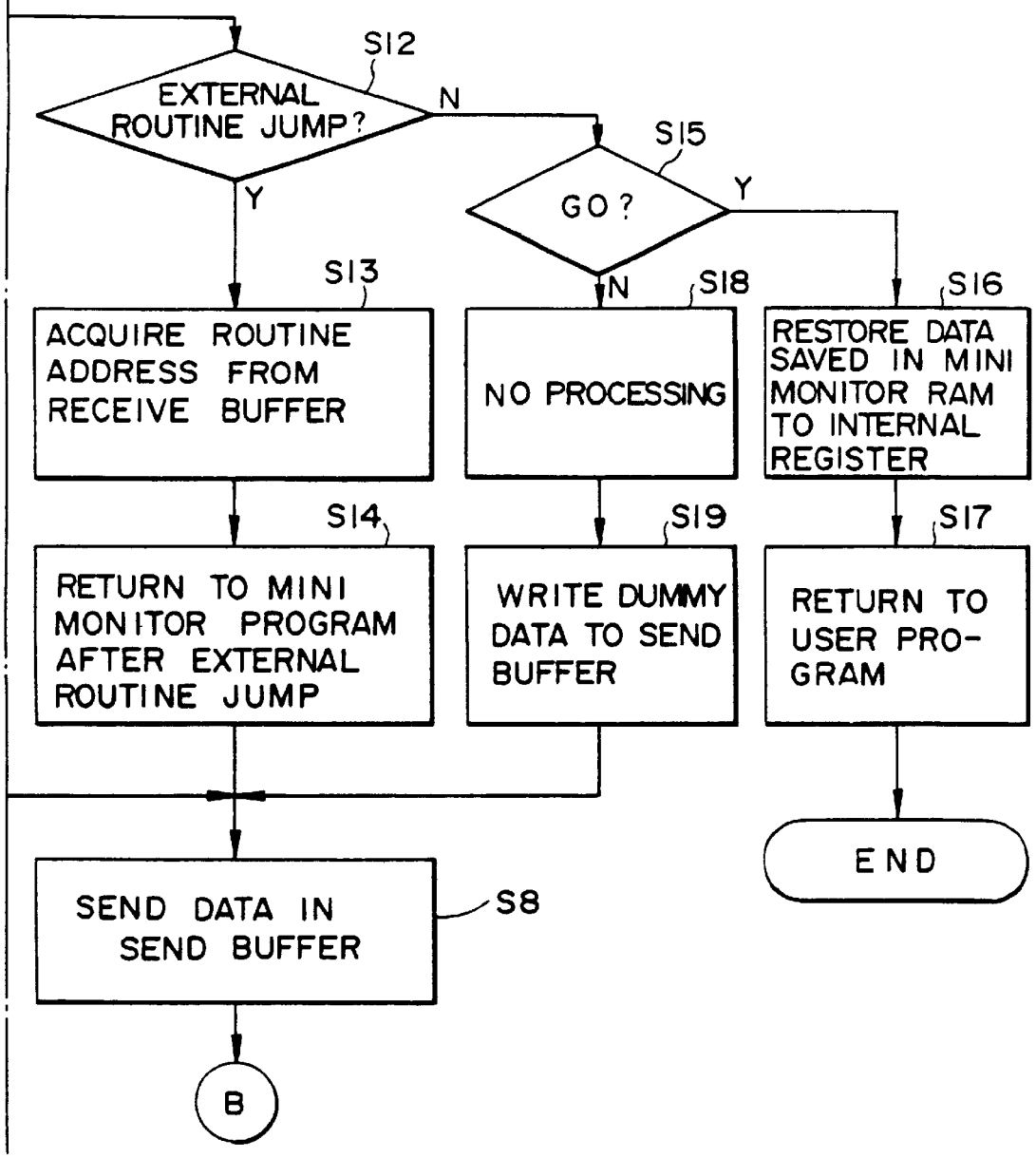
FIG. 14 (con't)

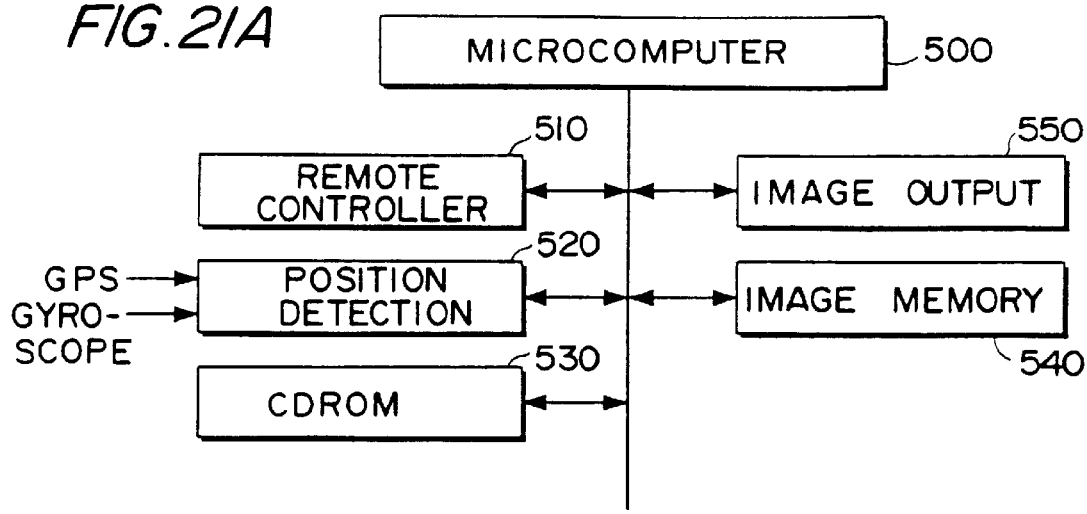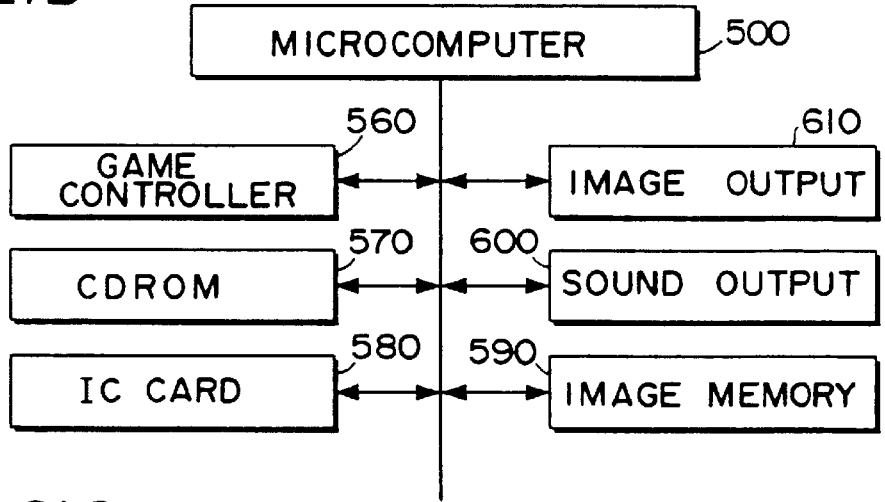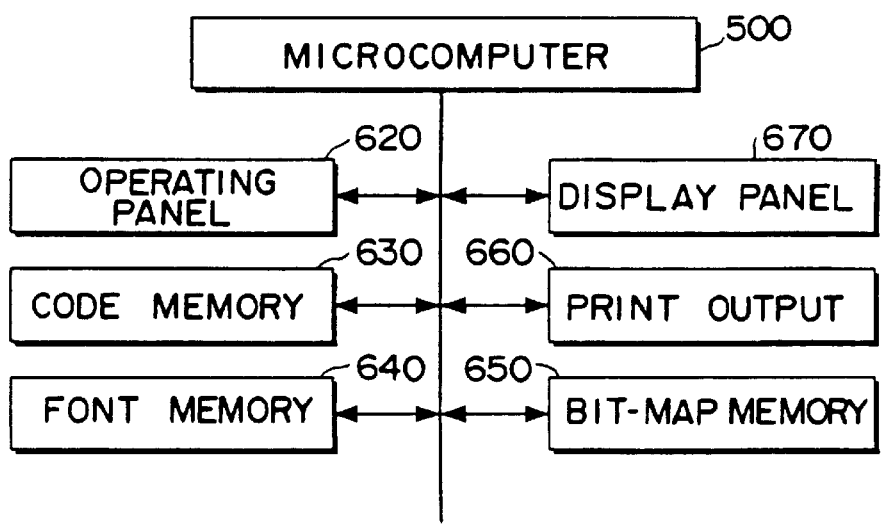

MICROCOMPUTER, ELECTRONIC EQUIPMENT AND DEBUGGING SYSTEM

TECHNICAL FIELD

The present invention relates to a microcomputer, electronic equipment comprising the microcomputer and a debugging system.

BACKGROUND OF ART

In recent years, demand has increased with respect to a microcomputer which can be incorporated to various types of electronic equipment such as game machines, car-navigation systems, printers, portable information terminals and which can realize a high-level information processing. The thus-incorporated microcomputer is typically mounted on a user board known as a target system. A designer for such a target system debugs software for operating the target system by the use of a software development support tool called an in-circuit emulator (ICE), for example.

In such a debugging operation, a user finds any bug in the program by the use of ICE and then rewrites a program stored in a memory such as a flash memory (EEPROM) into the debugged program. Thus, the user must frequently rewrite the program stored in the flash memory until the program will have no bug.

The methods of rewriting a program in a flash memory includes following two methods.

In a first method, a flash memory is removed from a target system, and then a debugging program is written into the removed flash memory through a ROM writer. Thereafter, the flash memory is again mounted to the target system.

In a second method, as shown in FIG. 15, a terminal 406 for connection to a ROM writer 412 is provided in a target system 400 to which a microcomputer 404 is mounted. When the ROM writer 412 is connected to this terminal 406 and a flash memory is mounted to the target system 400, a program stored in the flash memory 402 is rewritten.

However, the first method raised a problem in that time required to rewrite the program (turn-around time) is greatly increased, resulting in an extremely non-efficient debugging operation.

On the other hand, the second method raised a problem in that a program debugging system including a debugging tool 408 and a host system 410 cannot be integrated with a program rewriting system comprising the ROM writer 412 and a host system 414. In other words, the second method must perform the program debugging operation on the host system 410 and the program rewriting operation on the other host system 414. Thus, the program debugging and rewriting operations cannot be carried out on the same host system. This also reduces the efficiency in debugging.

DISCLOSURE OF THE INVENTION

It is therefore an objective of the present invention to provide a microcomputer, electronic equipment comprising the microcomputer, and a debugging system, all of which can improve the efficiency in the debugging operation.

To this end, the present invention provides a microcomputer having an on-chip debugging function, comprising:

a central processing unit for executing instructions; and first monitor means for performing data transfer to and from a debugging tool provided outside of the microcomputer, performing debugging processing and also performing processing for execution of a jump command to an address at which a control program for a given memory is stored, based on the receive data from the debugging tool.

According to the present invention, the first monitor means receives data from the debugging tool and executes a jump command to an address of the memory control program based on the receive data. Thus, the processing of a monitor program for executing the first monitor means ends, and the processing of the memory control program which writes a program into the memory may start. The first monitor means further performs various processings for debugging of the program. According to the present invention, therefore, both of the program writing processing to the memory and debugging processing can be realized by using the first monitor means. As a result, the program debugging operation can be more efficiently carried out to reduce time required to develop a program.

The memory may be a non-volatile memory in which data can be electrically erased and written, and the memory control program may include an initializing program and a writing program for the non-volatile memory. This makes it possible to perform erasing and writing operations easily in the non-volatile memory.

The receive data may contain a routine address at which the memory control program is stored, a write data to be written into the memory and a data address at which the write data is written. This makes it possible to write the write data into the memory after the jump to the address of the memory control program.

Data to be sent from the first monitor means to the debugging tool may contain a flag for announcing an error in the writing of data into the memory. Thus, if an error occurs in the writing of data into the memory, the occurrence of error can be announced to the debugging tool.

The debugging tool may include second monitor means for converting a debugging command into at least one primitive command; and the first monitor means may determine a primitive command to be executed based on receive data from the second monitor means and perform processing for execution of the determined primitive command. It is thus not required that the monitor program for executing the first monitor means has any complicated routine for executing debugging commands. Consequently, the size of instruction code in the monitor program can highly be reduced so that the on-chip debugging function can be realized through a reduced scale of hardware.

The primitive command may include a jump command to an address at which the memory control program is stored, a command for starting execution of a user program, a command for writing data into an address on a memory map in debugging mode and a command for reading data from the address on the memory map. Since the primitive commands are simplified in such a manner, the size of instruction code in the monitor program can be further reduced.

The receive data from the second monitor means may contain data used to identify a primitive command to be executed by the first monitor means. This makes it possible to transfer an instruction of execution of the primitive command easily from the second monitor means to the first monitor means.

The present invention further provides electronic equipment comprising: a microcomputer as described above; an input source of data to be processed by the microcomputer; and an output device for outputting data processed by the microcomputer. Thus, the debugging operation for a program operating the electronic equipment or other programs can more efficiently be carried out to reduce time required to develop the electronic equipment and to lower the manufacturing cost.

The present invention further provides a debugging system for a target system including a microcomputer, comprising:

a debugging tool provided outside of the microcomputer; and first monitor means for performing data transfer to and from the debugging tool, performing debugging processing and also performing processing for execution of a jump command to an address at which a control program for a given memory is stored, based on the receive data from the debugging tool.

According to the present invention, the first monitor means can perform both of any processing with respect to the memory (such as writing a program thereinto) and the debugging processing. Thus, the program debugging operation can more efficiently be carried out to reduce time required to develop a program.

BRIEF DESCRIPTION OF DRAWINGS

FIG. 1A is a view illustrating a CPU-switching type of ICE and FIG. 1B is a view illustrating a type of ICE with an installed monitor program.

FIGS. 5A to 5D illustrate the processing involved in the conversion (decomposition) of debugging commands into primitive commands.

FIG. 6 is a functional block diagram of an example of the structure of the SIO.

FIGS. 10A to 10D illustrate formats and types of send/receive data.

FIGS. 21A to 21C are internal block diagrams of various items of electronic equipment.

BEST MODE FOR CARRYING OUT THE INVENTION

Figure 2:
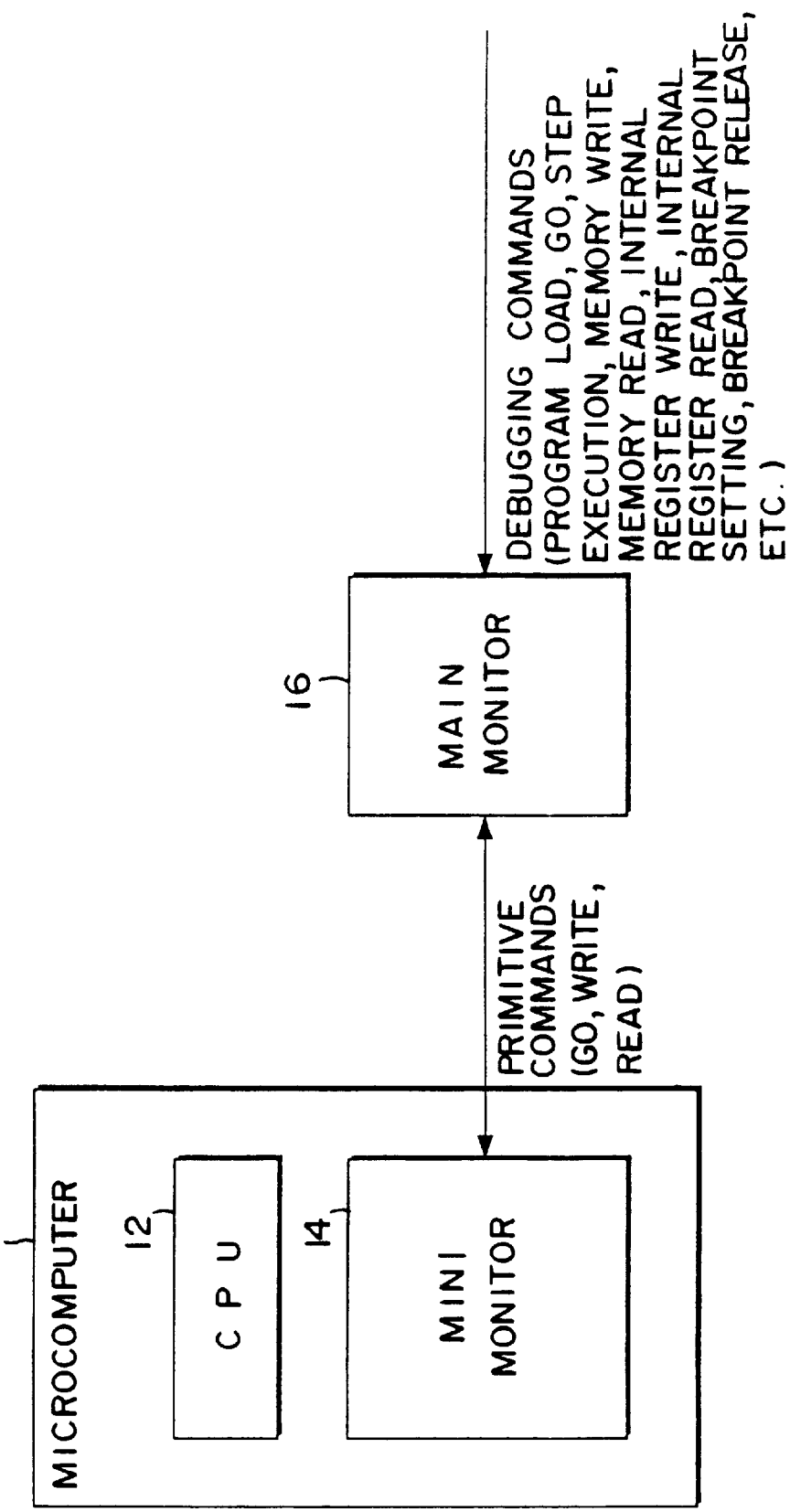
FIG. 2 is a view illustrating the mini monitor section.

A preferred embodiment of the present invention will now be described in detail with reference to the drawings.

1. Features of this Embodiment
(1) Mini Monitor Section

In the art, the CPU-switching (swapping) type of ICE shown in FIG. 1A is the most common type of ICE used to support the development of software to run on a target system. With this CPU-switching ICE, a microcomputer 302 is removed from a target system 300 during debugging, and a probe 306 of a debugging tool 304 is connected thereto instead. This debugging tool 304 emulates the operation of the removed microcomputer 302. The debugging tool 304 can also perform the various processes necessary for debugging.

However, this CPU-switching ICE has disadvantages in that there are a large number of pins on the probe 306 and also a large number of lines 308 of the probe 306. It is therefore difficult to emulate the operation of the microcomputer 302 at high frequencies (the limit is at approximately 33 MHz, by way of example). It is also difficult to design the target system 300. Furthermore, the operating environment of the target system 300 (signal timings and load conditions) changes between the situation when the microcomputer 302 is installed and is operating as designed and the situation in debugging mode when the debugging tool 304 is emulating the operation of the microcomputer 302. This CPU-switching ICE has another problem in that, if a different microcomputer is used, such as a modified version thereof, it is necessary to use a debugging tool of a different design and a probe in which the numbers and positions of the pins are different.

A known method of solving these disadvantages of this CPU-switching ICE is a type of ICE in which a monitor program 310 is installed in a target system 312, as shown in FIG. 1B. However, with this type of ICE with an installed monitor program, it has been necessary up until now to include functions for executing all of the debugging commands (program load, GO, step execution, memory read/write, internal register read/write, and breakpoint setting/release) within the monitor program 310. This means that the instruction code size of the monitor program 310 is extremely large (for example, 30 to 50 kilobytes). This means that the memory region that can be freely utilized by the user is reduced and also the differences in system between debugging and non-debugging operation cause problems. One method of solving the problem of FIG. 1B is a method called on-chip debugging, in which a monitor program is loaded onto the chip, but this method causes problems in that if a monitor program of a large instruction code size is provided on the chip, the size of the chip itself will increase.

In order to solve this problem, this embodiment of the invention employs a method wherein the monitor section is divided into a mini monitor section and a main monitor section.

In other words, a microcomputer 10 of this embodiment comprises a central processing unit (CPU) 12 and a mini monitor section (first monitor means) 14, as shown in FIG. 2. In addition, a main monitor section (second monitor means) 16 is provided outside the microcomputer 10. In this case, the main monitor section 16 performs processing to convert (decompose) debugging commands issued by a host system, for example, into primitive commands. In addition, the mini monitor section 14 transfers data to and from the main monitor section 16. The mini monitor section 14 determines the primitive commands to be executed, based on the data received from the main monitor section 16, and performs processing for executing those primitive commands.

In this case, commands such as program load, GO, step execution, memory write, memory read, internal register write, internal register read, breakpoint setting, or breakpoint release could be considered as the debugging commands that are the object of the conversion processing performed by the main monitor section 16. The main monitor section 16 executes processing to convert a wide range of complicated debugging commands into simple primitive commands such as GO, write (a write to a given address on the memory map, when in debugging mode), and read (a read from a given address on the memory map). Such a configuration makes it possible to greatly reduce the instruction code size of the mini monitor program run by the mini monitor section 14. This enables the implementation of an on-chip debugging function for the microcomputer 10.

In other words, the monitor program 310 of the type of ICE shown in FIG. 1B has routines for processing all of the debugging commands, such as program load, GO, and step execution. The instruction code size of the monitor program 310 is therefore extremely large (for example, 30 to 50 kilobytes), making it difficult to incorporate the monitor program 310 into a microcomputer 314 in practice.

In contrast thereto, the mini monitor program run by the 10 mini monitor section 14 of this embodiment only has routines for processing simple primitive commands such as GO, write, and read, making the instruction code size thereof extremely small (256 bytes, for example). This means that the mini monitor program can be installed in the microcomputer 10, enabling the implementation of an on-chip debugging function. It also makes it possible to restrain any reduction of the memory region that can be used freely by the user, to a minimum or even zero.

(2) External Routine Jump

Figure 16:
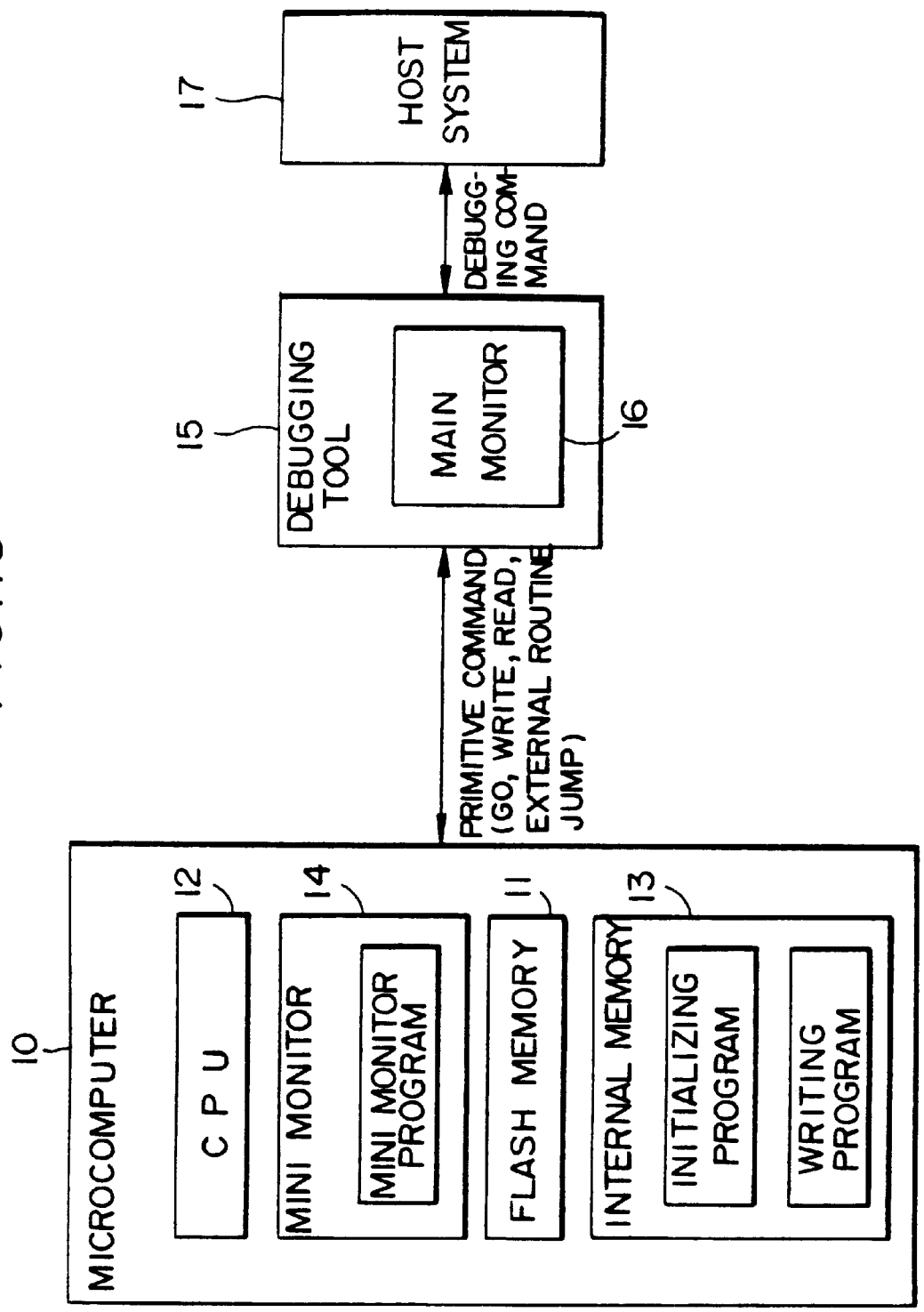
FIG. 16 is a view illustrating the features of this embodiment.

In this embodiment, as shown in FIG. 16, the aforementioned primitive commands include an external routine jump command (a command to jump to an address whereat the memory control program has been stored) in addition to GO, write and read commands. This makes it possible to perform program debugging and rewriting operations on an integrated system which comprises a debugging tool 15 and a host system 17. In other words, both the program debugging and rewriting operations can be performed on the single host system 17.

Figure 17:
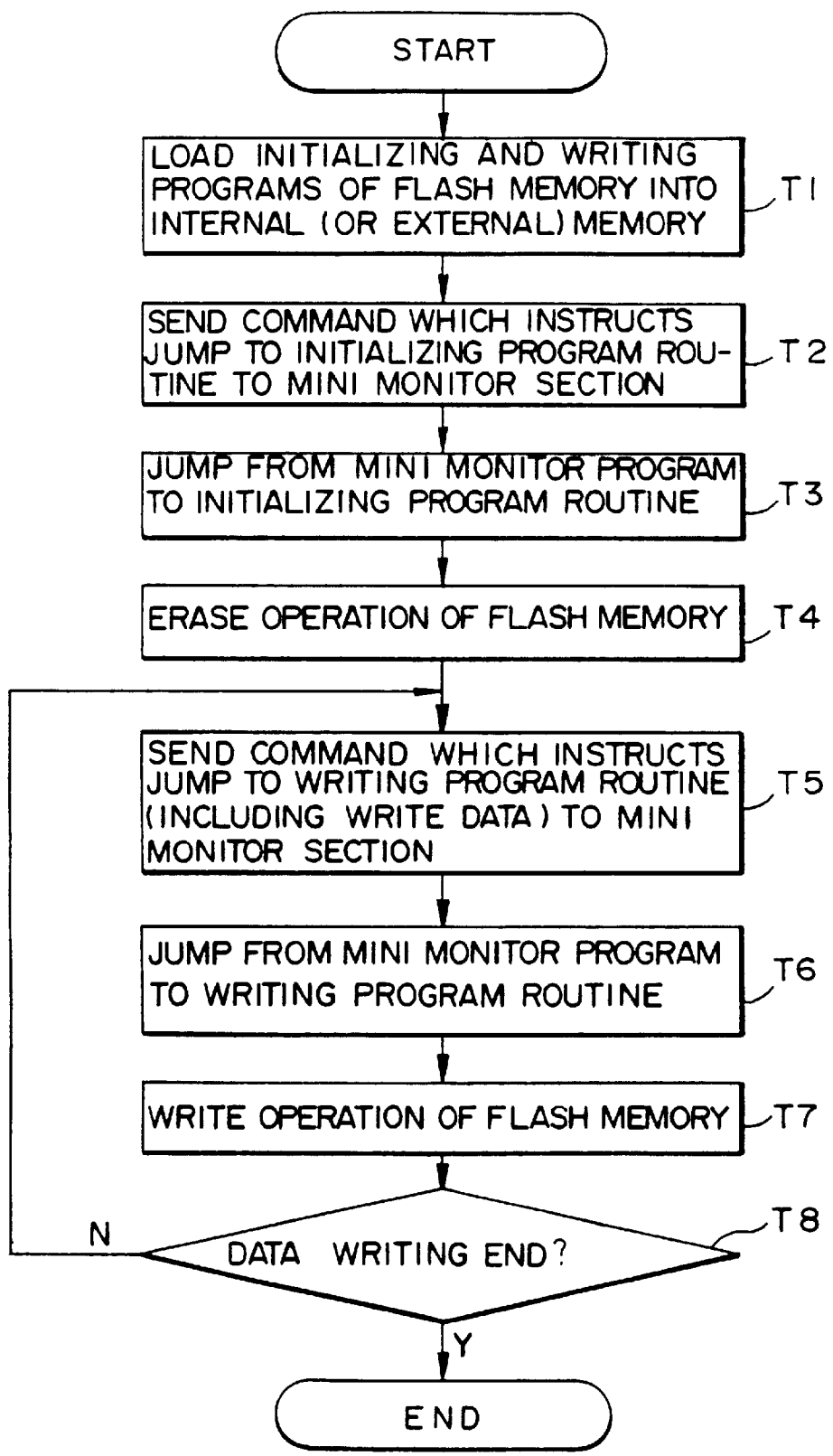
FIG. 17 is a flowchart illustrating the outline of a process wherein the primitive command contains an external routine jump command.

The outline of the process wherein the primitive commands include an external routine jump command will now be described with respect to the flowchart of FIG. 17.

First of all, an initializing program and a writing program for a flash memory 11 (which may externally be located) are loaded into an internal memory 13 (which may alternatively be an external memory) in the microcomputer 10 (step T1).

An external routine jump command instructing a jump to the routine of the initializing program is then transmitted from the main monitor section 16 to the mini monitor section 14 (step T2). The mini monitor section 14 executes this external routine jump command so that the procedure jumps from the mini monitor program to the initializing program routine (step T3). Thus, the initializing program is executed and an erase operation of the flash memory 11 is performed (step T4).

Another external routine jump command (which contains write data) instructing a jump to the writing program is subsequently transmitted from the main monitor section 16 to the mini monitor section 14 (step T5). The mini monitor section 14 executes this external routine jump command so that the procedure jumps from the mini monitor program to the writing program routine (step T6). The writing program is thus executed to perform the writing operation of the flash memory 11 (step T7). The main monitor section 16 continues to transmit the command instructing a jump to the writing program to the mini monitor section 14 until all the data forming the user program have been written into the flash memory 11 (step T8) Thereafter, the rewriting operation to the flash memory 11 is terminated.

Figure 15:
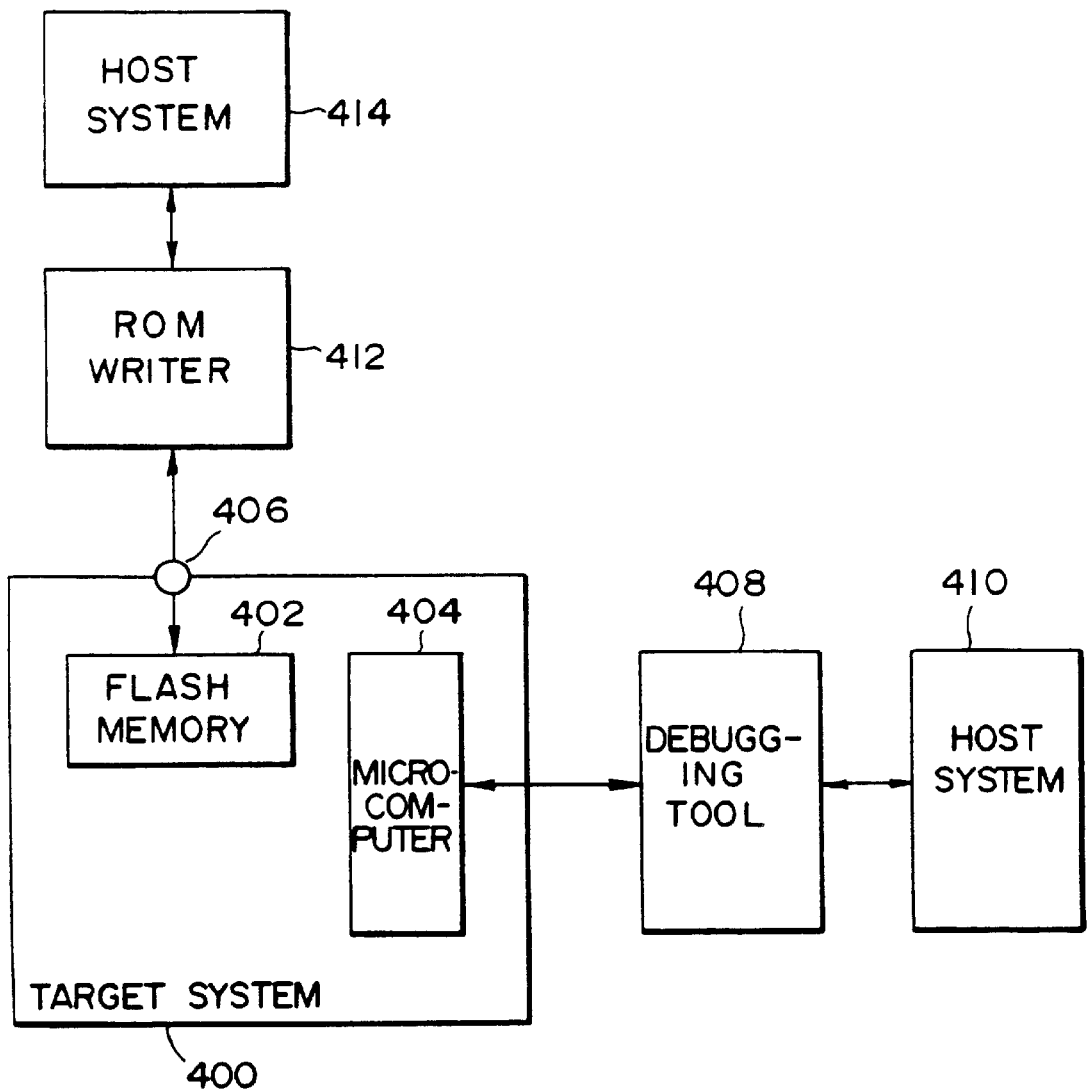
FIG. 15 is a view illustrating a system for rewriting a program in a flash memory by the use of a ROM writer connected to the target system.

In an arrangement of FIG. 15, the program debugging operation is performed on a host system 410, and the program rewriting operation is performed on another host system 414. Therefore, the efficiency in operation will be degraded.

In this embodiment, however, the program debugging operation is first performed on the host system 17 through the functions of the mini monitor section 14 and the main monitor section 16. If any bug is found, an external routine jump command is utilized to perform the program rewriting operation. The debugging operation is again performed after termination of the program rewriting operation. In such a manner, this embodiment can perform both the program debugging and writing operations on the single host system 17. This can greatly improve the efficiency in operation.

Figure 18:
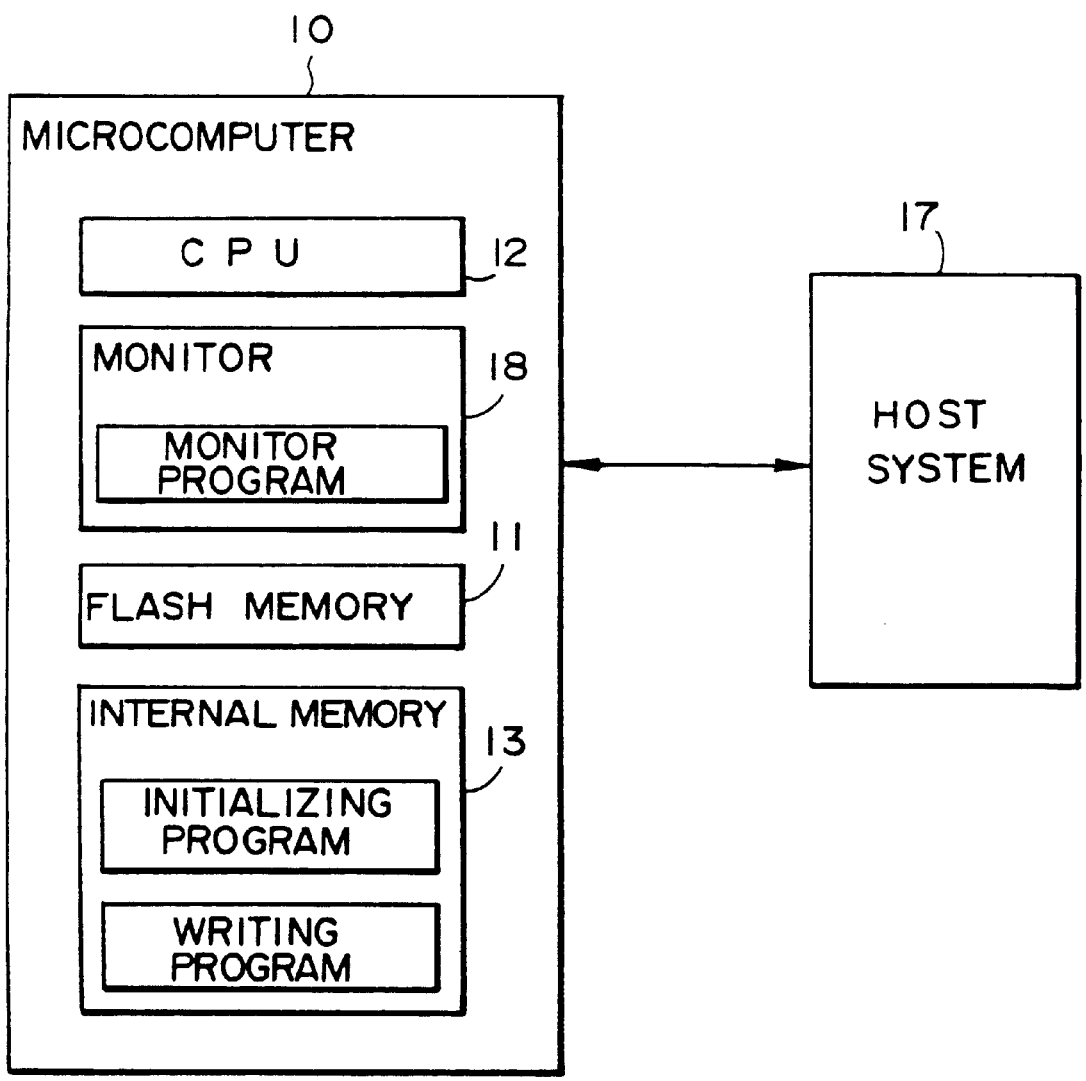
FIG. 18 is a view illustrating an arrangement in which the monitor section is not divided into the mini monitor section and the main monitor section.

FIG. 16 shows a monitor section divided into the mini monitor section 14 and the main monitor section 16, and only the mini monitor section 14 is included in the microcomputer 10. However, the microcomputer may comprise a monitor section 18 without such a division, as shown in FIG. 18.

2. Detailed Structural Example

Figure 3:
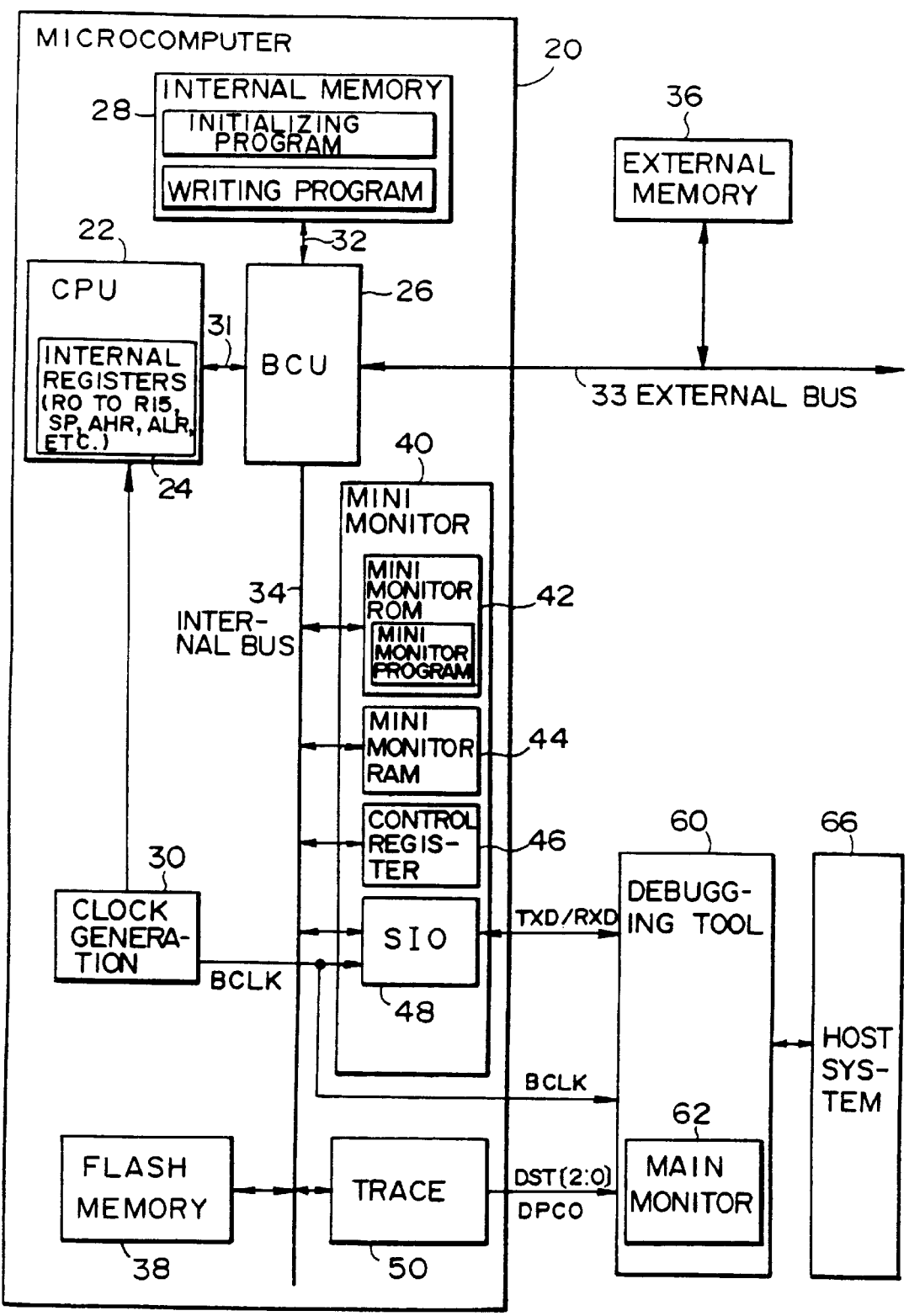
FIG. 3 is a functional block diagram of an example of the structure of the microcomputer and debugging system according to the embodiment of the present invention.

A detailed example of the structure of the microcomputer and debugging system of this embodiment is shown in FIG. 3. As shown in FIG. 3, a microcomputer 20 comprises a CPU 22, a bus control unit (BCU) 26, internal memory (internal ROM and internal RAM other than a mini monitor ROM 42 and a mini monitor RAM 44) 28, a clock generation section 30, a flash memory 38, a mini monitor section 40 (first monitor means), and a trace section 50.

In this case, the CPU 22 is designed to execute various instructions and comprises internal registers 24. The internal registers 24 comprise general-purpose registers R0 to R15 as well as a stack pointer (SP) register, a higher arithmetic register (AHR) for storing sum-of-products result data, and a lower arithmetic register (ALR) for storing sum-of-products result data, which are special registers.

The BCU 26 is designed to control buses. It controls a bus 31 of a Harvard architecture connected to the CPU 22, a bus 32 connected to internal memory 28, an external bus 33 connected to external memory 36, and an internal bus 34 connected to components such as the flash memory 38, the mini monitor section 40 and the trace section 50.

The clock generation section 30 generates the various clock signals used within the microcomputer 20. Note that a BCLK signal is also supplied from the clock generation section 30 to an external debugging tool 60.

The flash memory 38 stores the user program and other programs. The flash memory 38 may be located outside of the microcomputer 20.

Although in FIG. 3, an initializing program and a writing program, which are memory control programs, are loaded into the internal memory 28, these programs may be loaded into the external memory 36.

The mini monitor section 40 comprises the mini monitor ROM 42, the mini monitor RAM 44, a control register 46, and an SIO (serial input/output) 48.

In this case, a mini monitor program is stored in the mini monitor ROM 42. The mini monitor program in this embodiment of the invention executes only simple primitive commands such as GO, read, and write. Thus the memory capacity of the mini monitor ROM 42 can be restrained to 256 bytes, by way of example, and thus the microcomputer 20 can be made more compact while still retaining an on-chip debugging function.

The contents of the internal registers 24 of the CPU 22 are saved to the mini monitor RAM 44 at a transition to debugging mode (when a break occurs in a user program). This ensures that the execution of the user program can restart properly after debugging mode ends. Reading and other manipulations of the contents of these internal registers can be implemented by primitive read and other commands within the mini monitor program.

The control register 46 is a register for controlling the various debugging processes, and contains a step execution enable bit, a break enable bit, a break address bit, and a trace enable bit, etc. The CPU 22 operating in accordance with the mini monitor program can implement the various debugging processes by writing data to the bits of the control register 46 and reading data from those bits.

The SIO 48 is a circuit for transferring data to and from the debugging tool 60 that is provided outside the microcomputer 20. The SIO 48 and the debugging tool 60 are connected by a TXD/RXD line (data transfer line).

The trace section 50 is designed to implement a real-time trace function. The trace section 50 and the debugging tool 60 are connected by four lines: a 3-bit DST [2:0] indicating the state of instruction execution at the CPU 22 and a DPCO indicating the value in the program counter (PC) for the branch destination.

The debugging tool 60 comprises a main monitor section 62 and is connected to a host system 66 implemented by a personal computer or the like. If the host system 66 issues debugging commands such as program load and step execution in answer to the user's actions, the main monitor section 62 converts (decomposes) those debugging commands into primitive commands. If the main monitor section 62 sends data indicating the execution of primitive commands to the mini monitor section 40, the mini monitor section 40 executes the indicated primitive commands.

Figure 4:
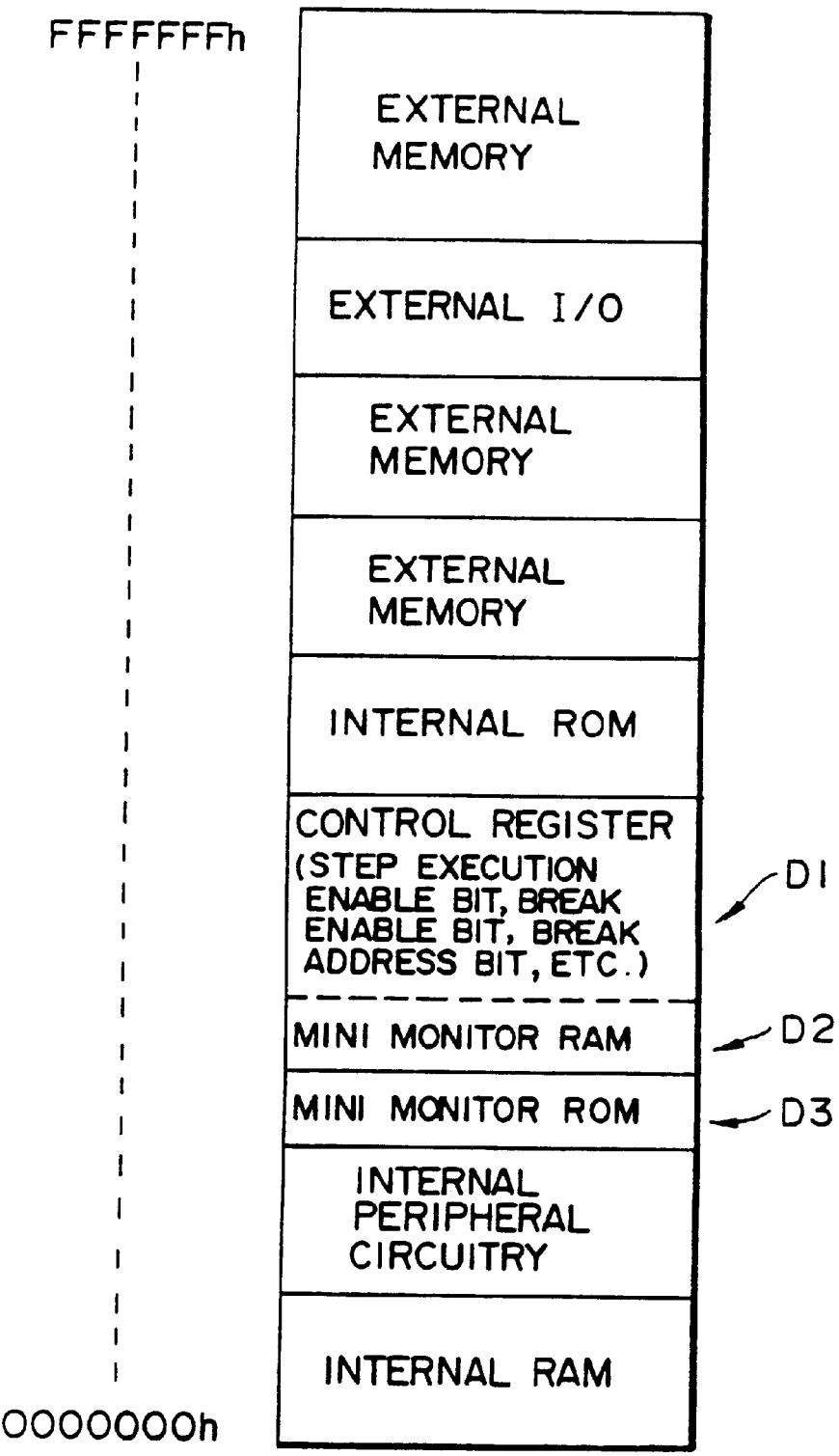
FIG. 4 illustrates a memory map in debugging mode.

An example of the memory map in debugging mode is shown in FIG. 4. The addresses of the control register 46, the mini monitor RAM 44, and the mini monitor ROM 42 of FIG. 3 are allocated to the memory map when in debugging mode, as shown at D1, D2, and D3 in FIG. 4.

3. Conversion to Primitive Commands

The conversion of various debugging commands into primitive commands is shown schematically in FIGS. 5A to 5D.

Assume, by way of example, that a debugging command is issued to load 12-byte program (ADD . . . , SUB . . . , AND . . . , OR . . . , XOR . . . , LD.W . . . ) to an address 80010*h*, as shown in FIG. 5A. In this case, this program load command is converted into three primitive write commands: write (80010*h*, ADD . . . , SUB . . . ), write (80014*h*, AND . . . , OR . . . ), and write (80018*h*, XOR . . . , LD.W . . .). In other words, the mini monitor program implements a program load command by executing these three primitive write commands.

Assume that a debugging command that is a step execution command is issued, as shown in FIG. 5B. When this happens, this step execution command is converted into a write command for the step execution enable bit of the control register 46 of FIG. 3 (a write command to the address at D1 in FIG. 4) and a Go command. In other words, the mini monitor program implements the step execution command by executing these primitive write and GO commands.

Assume that a debugging command that is an internal register read command is issued, as shown in FIG. 5C. When this happens, this internal register read command is converted into a read command from the mini monitor RAM (the save destination of the contents of the internal registers) on the memory map (a read command from the address at D2 in FIG. 4). In other words, the mini monitor program implements an internal register read command by executing this primitive read command. An internal register write command, a memory read command, and a memory write command are all implemented in a similar fashion.

Finally, assume that a debugging command that is a breakpoint setting command is issued, as shown in FIG. 5D. When this happens, this breakpoint setting command is converted into write commands for the break enable bit and break address bit of the control register 46. In other words, the mini monitor program implements a breakpoint setting command by executing these primitive write commands.

In the thus-configured embodiment, complicated, diverse debugging commands can be converted into simple, primitive read, write, and GO commands. In addition, the instruction code size of the mini monitor program is extremely small, because only these primitive read, write, and GO commands need to be executed. As a result, the memory capacity of the mini monitor ROM 42 can be made small and an on-chip debugging function can be implemented within a compact hardware structure.

4. Structural Example of SIO

An example of the structure of the SIO 48 is shown in FIG. 6. The SIO 48 comprises a send/receive buffer 70, a shift register 76, a send/receive switching section 78, a clock control section 80, and a control register 84.

The send/receive buffer 70 is designed to hold send data and receive data temporarily, and comprises a send buffer 72 and a receive buffer 74. The shift register 76 has the functions of converting send data from the send buffer 72 from parallel data into serial data, then outputting it to the send/receive switching section 78. It also has the functions of converting receive data from the send/receive switching section 78 from serial data into parallel data, then outputting it to the receive buffer 74. The send/receive switching section 78 is designed to switch between sending and receiving data. This enables half-duplex data transfer, using TXD/RXD.

The clock control section 80 uses the incorporated frequency division circuit 82 to divide BCLK, and outputs a sampling clock signal SMC1 obtained by this division to the shift register 76. The operation of the shift register 76 is based on this SMC1. The BCLK signal is also supplied to the debugging tool 60. This ensures that BCLK is used in common by the microcomputer 20 and the debugging tool 60.

The division ratio of the frequency division circuit 82 is set by the control register 84. In other words, the mini monitor program run by the CPU 22 can set the division ratio of the frequency division circuit 82 by writing a desired division ratio to the control register 84. Note that the address of the control register 84 is allocated to the D1 position of FIG. 4, in a similar manner to that of the control register 46 of FIG. 3.

5. Structural Example of Debugging Tool

Figure 7:
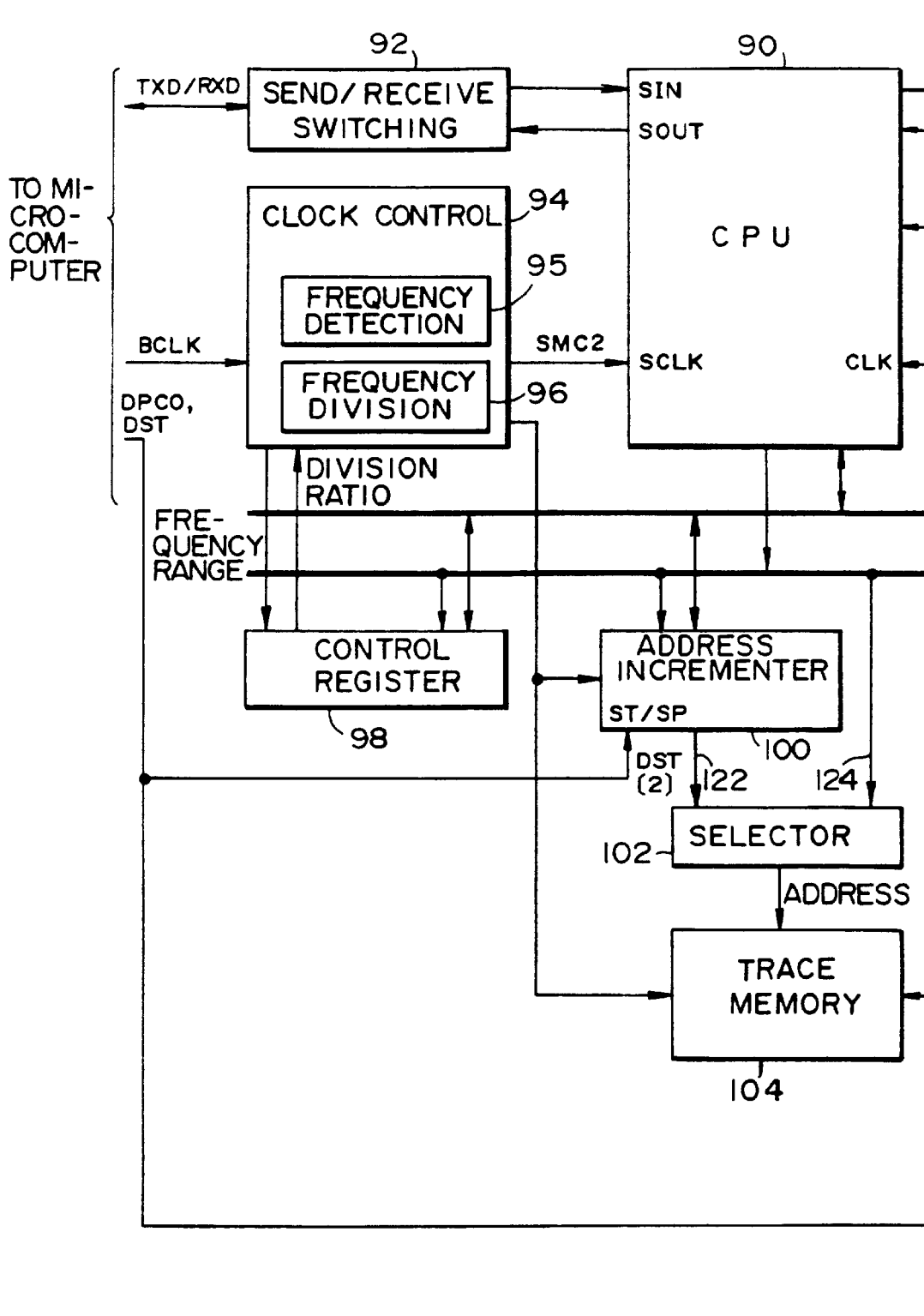
FIG. 7 is a functional block diagram of an example of the structure of a debugging tool.

An example of the structure of the debugging tool 60 is shown in FIG. 7.

A CPU 90 runs a program stored in a ROM 108, providing overall control of the debugging tool 60. A send/receive switching section 92 is designed to switch between sending and receiving data. A clock control section 94 controls a clock signal supplied to an SCLK terminal of the CPU 90, an address incrementer 100, and a trace memory 104. The BCLK signal from the microcomputer 20 (the SIO 48) is input to this clock control section 94. The clock control section 94 comprises a frequency detection circuit 95 and a frequency division circuit 96. The frequency detection circuit 95 detects the frequency range to which BCLK belongs, then outputs the result to a control register 98. In addition, the division ratio of the frequency division circuit 96 is controlled by the control register 98. In other words, a main monitor program run by the CPU 90 (stored in a main monitor ROM 110) reads out the frequency range of BCLK from the control register 98. The main monitor program determines the optimal division ratio corresponding to this frequency range, and writes that division ratio to the control register 98. The frequency division circuit 96 divides BCLK by this division ratio to generate SMC2, which it outputs to the SCLK terminal of the CPU 90.

The address incrementer 100 is designed to increment the address in trace memory. A selector 102 selects either of a line 122 (for the address output by the address incrementer 100) or a line 124 (for an address from an address bus 120), to output an address to an address terminal of the trace memory 104. Another selector 106 selects either of a line 126 (for DST[2:0] and DPCO, which are output by the trace section 50 of FIG. 3) or a line 128 (for a data bus 118), to output data to a data terminal of the trace memory 104 or take in data from that data terminal.

The ROM 108 comprises the main monitor ROM 110 (equivalent to the main monitor section 62 of FIG. 3), and a main monitor program is stored in the main monitor ROM 110. This main monitor program performs processing for converting debugging commands into primitive commands, as described previously with respect to FIGS. 5A to 5D. A RAM 112 acts as a work area for the CPU 90.

An RS-232C interface 114 and a parallel interface 116 function as interfaces to the host system 66 of FIG. 3, and debugging commands from the host system 66 are input to the CPU 90 through these interfaces. A clock generation section 18 generates the clock signal that activates the CPU 90.

The real-time trace processing according to this embodiment will be briefly described. In this embodiment, a 3-bit DST[2:0] indicating the state of instruction execution at the CPU 22 of FIG. 3 and a DPCO indicating the program counter (PC) of the branch destination are stored in the trace memory 104. Trace data is created from the data stored in the trace memory 104 and the source code of a user program. This configuration makes it possible to implement a real-time trace function, while reducing the number of lines connecting the microcomputer 20 and the debugging tool 60.

Figure 8A:
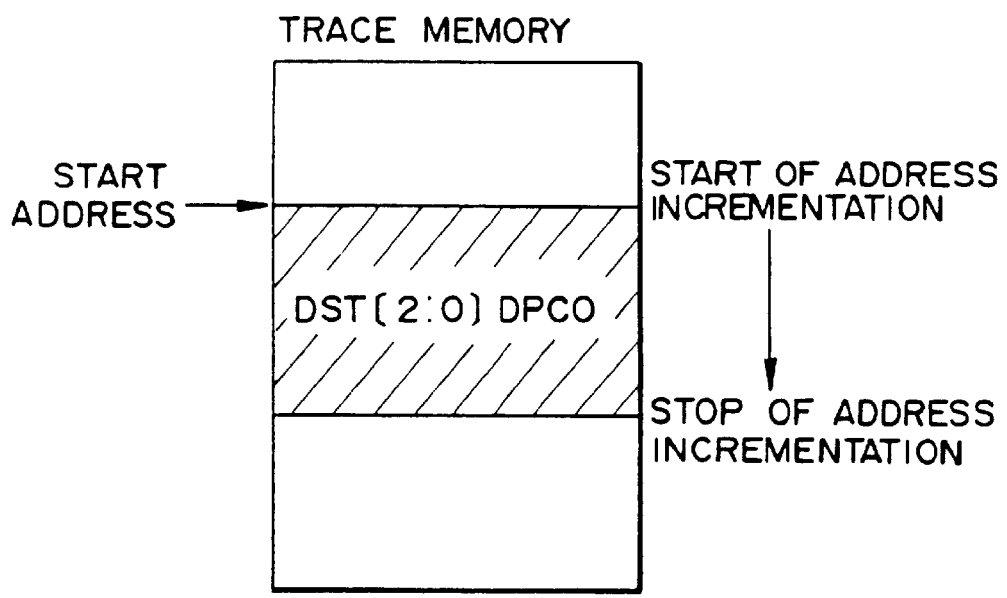
FIGS. 8A and 8B illustrate a real-time trace processing.
Figure 8B:
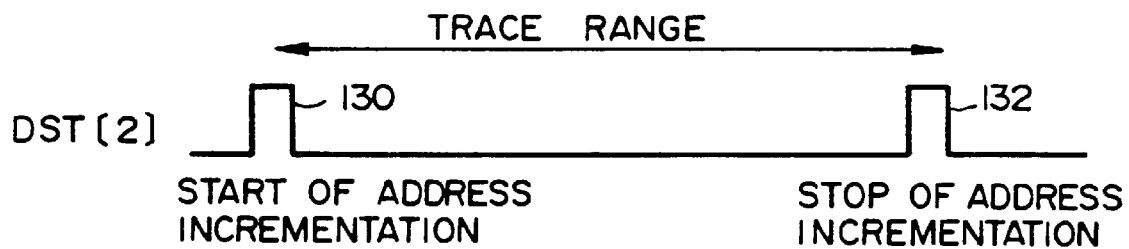

In user program execution mode, the line 122 is selected and the output of the address incrementer 100 is input to the address terminal of the trace memory 104 through the selector 102. In addition, the line 126 is selected and DST [2:0] and DPCO are input to the data terminal of the trace memory 104 through the selector 106. In this case, the address incrementer 100 is initially set by the CPU 90 to the start address, using the data bus 118 and the address bus 120, as shown in FIG. 8A. A line for DST[2], specifying the trace range, is also connected to an ST/SP (start/stop) terminal of the address incrementer 100. When a first pulse 130 is input to the DST [2] line, the address incrementer 100 starts incrementing the address, as shown in FIG. 8B. When a second pulse 132 is input to the DST [2] line, the address incrementer 100 stops incrementing the address and the trace operation halts. In this manner, data (DST [2:0] and DPCO) within the desired trace range can be stored in the trace memory 104.

When operation shifts from user program execution mode to debugging mode, on the other hand, the line 124 is selected and an address from the address bus 120 is input to the address terminal of the trace memory 104 through the selector 102. The line 128 is also selected and data is output from the trace memory 104 over the data bus 118, through the selector 106. This makes it possible to read out the data (DST[2:0] and DPCO) stored in the trace memory 104 to the CPU 90 (main monitor program) when in debugging mode. It is possible to create trace data, based on the read-out data and the source code of a user program.

6. Data Transfer

Figure 9A:
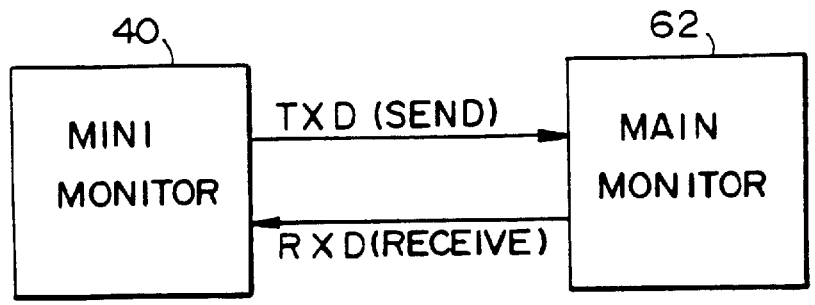
FIGS. 9A to 9C illustrate various communication methods between a mini monitor section and a main monitor section.

As a method of transferring debugging data between the mini monitor section 40 and the main monitor section 62, there is a full-duplex communication using separate TXD (transmission) and RXD (reception) lines, as shown in FIG. 9A.

When two lines are used for such communication of debugging data, however, the number of terminals (or pins) of the microcomputer is increased. This leads to increase of the manufacturing cost for the microcomputer.

Figure 9B:
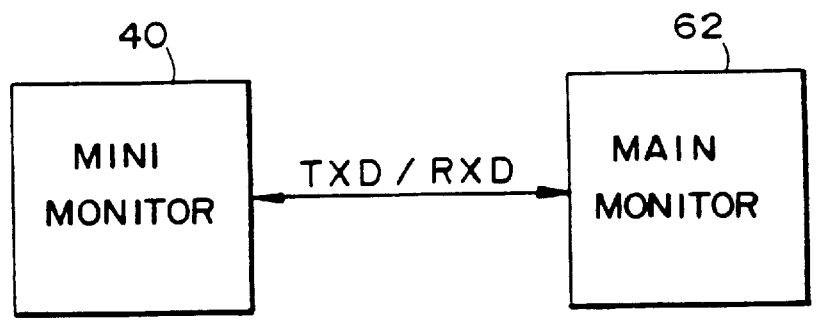

In this embodiment, a single TXD/RXD line (bidirectional communication line) is provided between the mini monitor section 40 and the main monitor line 62 to perform a half-duplex bidirectiona communication, as shown in FIG. 9B. Thus, the number of terminals of the microcomputer can be minimized to reduce the cost of the microcomputer.

Figure 9C:
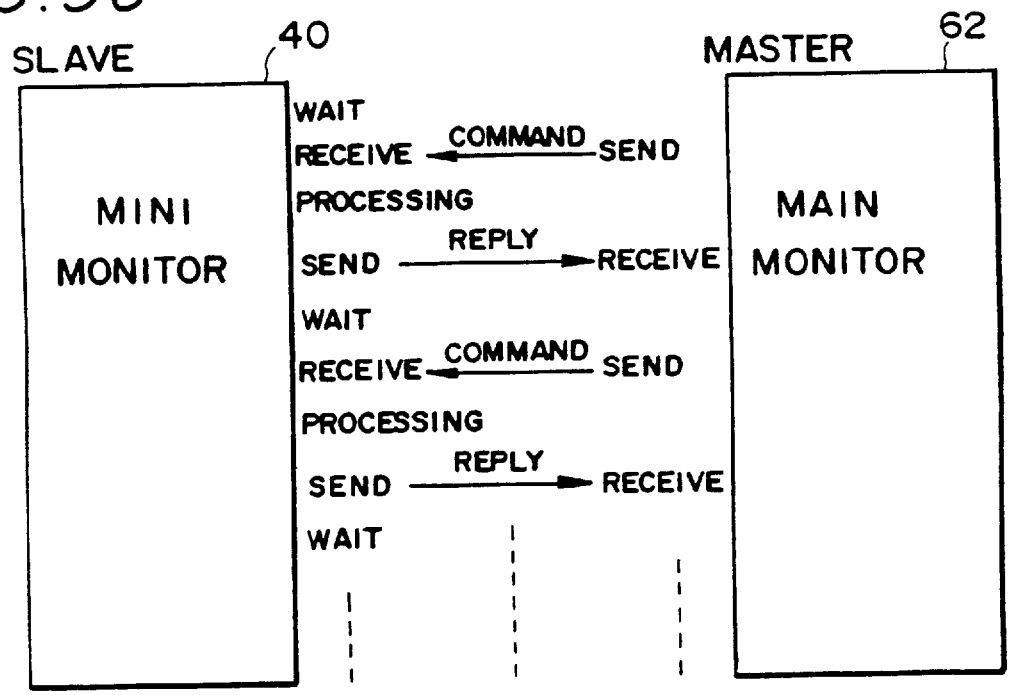

In this embodiment, further, on condition that the mini monitor section 40 as a slave receives data from the main monitor section 62 as a master, the mini monitor section 40 performs processing for the receive data and then sends response data corresponding to the receive data to the main monitor section 62, as shown in FIG. 9C. In other words, when the main monitor section 62 sends data (command) to the mini monitor section 40 which is in the wait state, the mini monitor section 40 performs processing corresponding to the received data. Data (reply data) corresponding to the received data is then sent to the main monitor section 62. Thereafter, the mini monitor section 40 is placed in the wait state until it receives data from the main monitor section 62. In other words, the mini monitor section 40 is stopped in operation until it receives data from the main monitor section 62 and started in operation when the mini monitor section 40 receives the data. This enables a proper transfer of data between the mini monitor section 40 and the main monitor section 62 while utilizing a single communication line.

The communication method as shown in FIG. 9A is advantageous than that of FIG. 9B with respect to high-speed data communication since the separate TXD and RXD lines are utilized. The communication method of FIG. 9A is further advantageous in that if a communication error occurs in one of the mini monitor and main monitor sections 40, 62, a message of error can instantly be returned to the other of the mini monitor and main monitor sections 40, 62. For example, if a communication error occurs in the mini monitor section 40, it can instantly return a message of error to the main monitor section 62 through the TXD line without waiting the termination of data reception through the RXD line.

On the other hand, in this embodiment, a BCLK signal is used in common by the mini monitor and main monitor sections 40, 60. This makes it possible to perform a high-speed data communication. Therefore, the high-speed transfer of debugging data can be carried out without any problem even if a single communication line as shown in FIG. 9B is provided rather than two communication lines as shown in FIG. 9A.

Moreover, the send/receive data in this embodiment is of shorter fixed-length (e.g., 14 bytes). Therefore, if any communication error occurs in the mini monitor section 40, for example, time delay will not be very increased even though a message of error is transmitted after the reception has terminated. Since the length of the send/receive data is shorter, the occurrence of communication error itself can be minimized.

In such a manner, by providing only one communication line for debugging data, the number of terminals of the microcomputer can be reduced. Disadvantages such as reduction of communication speed or delay of error message can be overcome by using BCLK in common or using send/receive data of shorter fixed-length.

7. Format and Type of Send/receive Data

FIG. 10A shows an example of a format of data to be sent or received through the TXD/RXD line. The send/receive data is a fixed-length data of 14 bytes comprising one byte of ID field (or a field for command identifying data), one byte of data size field, four bytes of address field, four bytes of data 1 field and four bytes of data 2 field.

As shown in FIG. 10B, "00h" identifying a GO command is set at the ID field of the data to be received by the mini monitor section 40 when the main monitor section 62 instructs the mini monitor section 40 to execute a GO command. In this case, the mini monitor section 40 will not send data to the main monitor section 62.

As shown in FIG. 10C, "01h" identifying a write command is set at the ID field of the data to be received by the mini monitor section 40 when the main monitor section 62 instructs the mini monitor section 40 to execute a write command. Furthermore, write address, write data 1 and write data 2 are set at the address, data 1 and data 2 fields of the receive data, respectively. "01h" is set at the data 1 field of the send data to be sent from the mini monitor section 40.

Various types of write commands can be used, such as a write command for byte data, a write command for half-word data, a write command for word data and a write command for double-word data, depending on the length of the data to be written. In such a case, different ID's will be allocated to the respective write commands.

As shown in FIG. 10D, "02h" identifying a read command is set at the ID field of the data to be received by the mini monitor section 40 when the main monitor section 62 instructs the mini monitor section 40 to execute a read command. A read address is also set at the address field of the receive data. Read data 1 and read data 2, which are obtained by processing the read command, are set at the data 1 and data 2 fields of the send data to be sent from the mini monitor section 40, respectively.

In this embodiment, primitive commands to be executed by the mini monitor section 62 include an external routine jump command, a data fill command and other commands in addition to GO, write and read commands.

Figure 11A:
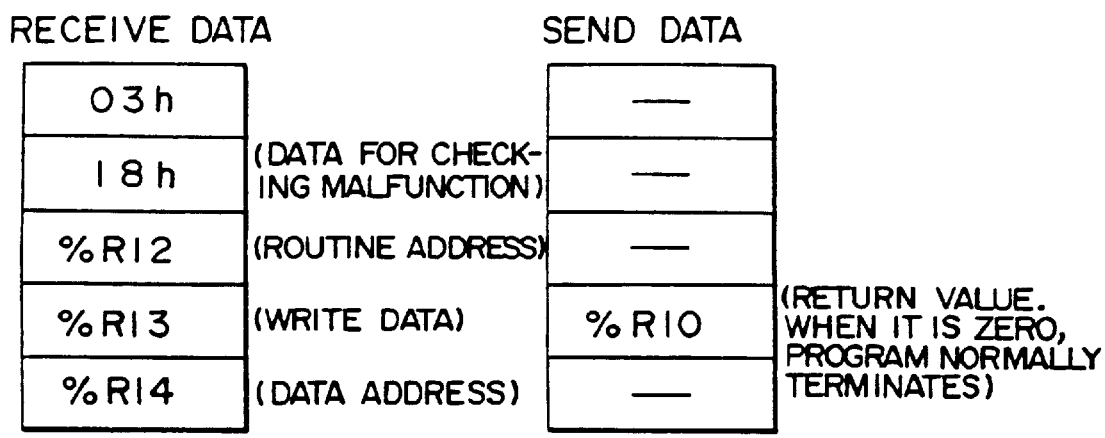
FIGS. 11A and 11B also illustrate formats and types of send/receive data.

An external routine jump command is one for instructing a jump to an external routine. When such an external routine jump command is used, the procedure can jump to the routine of an initializing program or a writing program of a flash memory (EEPROM), for example. As shown in FIG. 11A, "03h" identifying an external routine jump command is set at the ID field of the data to be received by the mini monitor section 40 when the main monitor section 62 instructs the mini monitor section 40 to execute an external routine jump command. 18h (data for checking malfunction), %R12 (routine address), %R13 (write data) and %R14 (data address) are also set at the data size, address, data 1 and data 2 fields of the receive data, respectively. Furthermore, %R10 (return value; if the return value is 0, the program will normally be terminated) is set at the data 1 field of the send data to be sent from the mini monitor section 40.

Figure 11B:
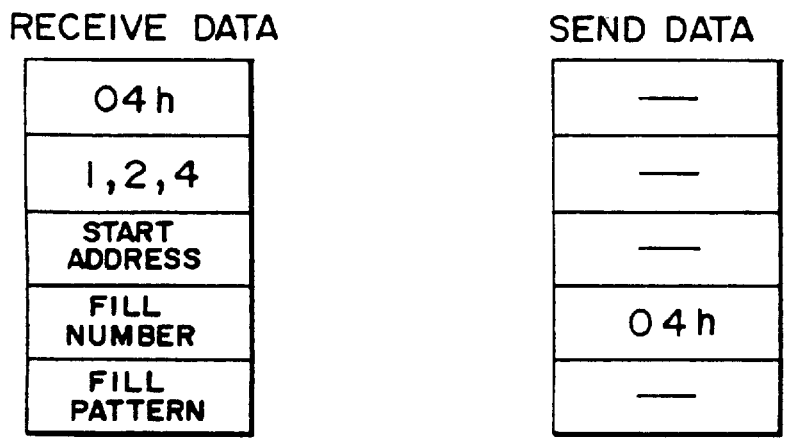

A data fill command is one for filling a memory with a given value (e.g., 0). For example, if all the bits in a large-capacity memory are to be set at the value of zero, using a write command will very prolong the processing time. In such a case, a data fill command is useful. When the main monitor section 62 instructs the mini monitor section 40 to execute a data fill command, "04h" identifying a data fill command is set at the ID field of the data to be received by the mini monitor section 40, as shown in FIG. 11B. Furthermore, data size 1, 2 or 4, start address, fill number, fill pattern are set at the data size, address, data 1 and data 2 fields of the receive data, respectively.

According to this embodiment, data from the main monitor section 62 includes primitive command identifying data (ID) to be executed by the mini monitor section 40. Thus, the mini monitor section 40 can simply and easily receive an instruction for execution of primitive commands.

8. Detailed Process in Mini Monitor Section

The detailed process in the mini monitor section will now be described.

Figure 12:
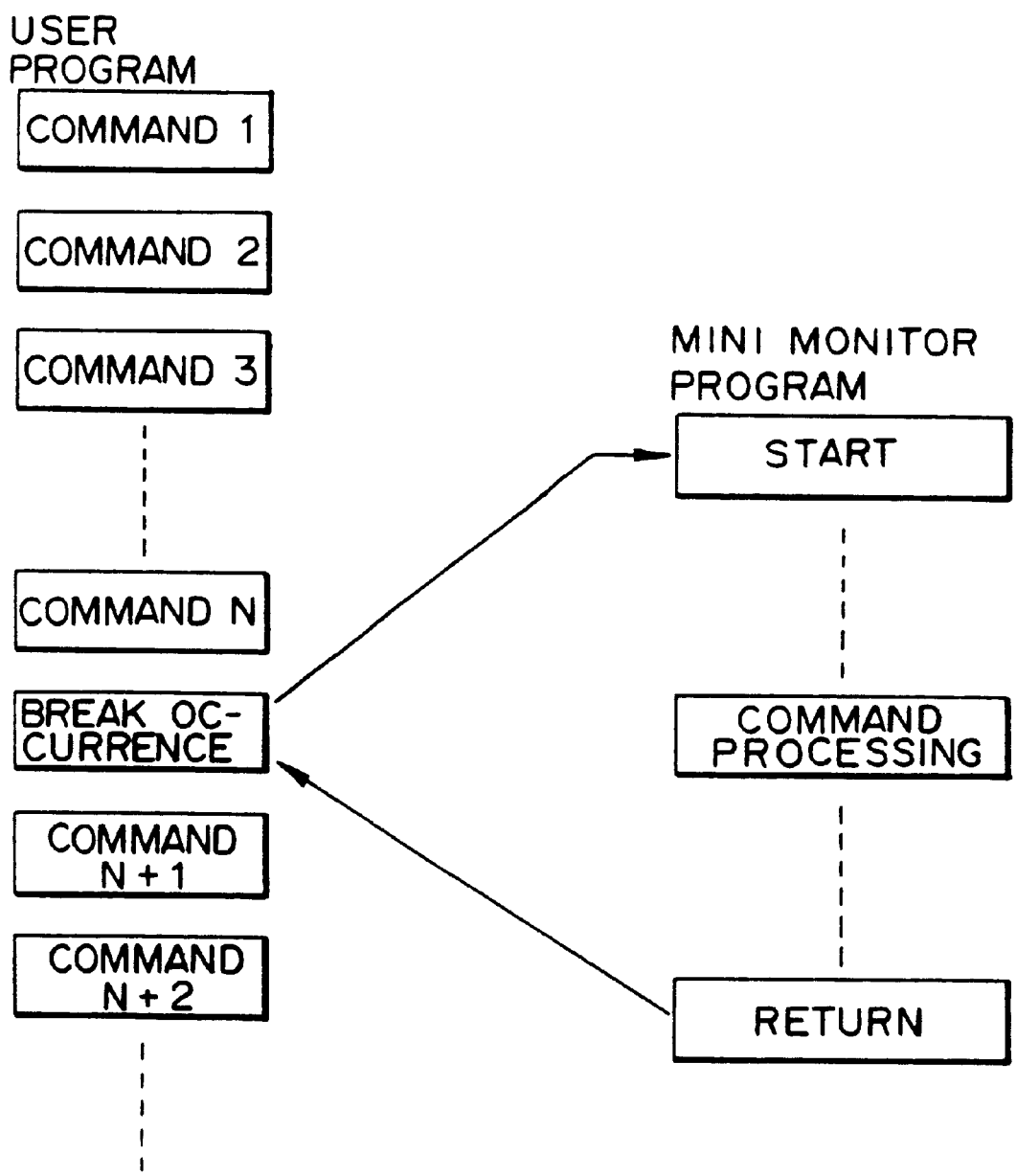
FIG. 12 illustrates the transition to debugging mode from user program execution mode.

As shown in FIG. 12, if a break occurs during execution of the user program, the process of the mini monitor program is started to shift the procedure from the user program execution mode to the debugging mode. When the mini monitor program has performed a given command and then executes a return instruction, the procedure will return from the debugging mode to the user program execution mode.

Figure 13:
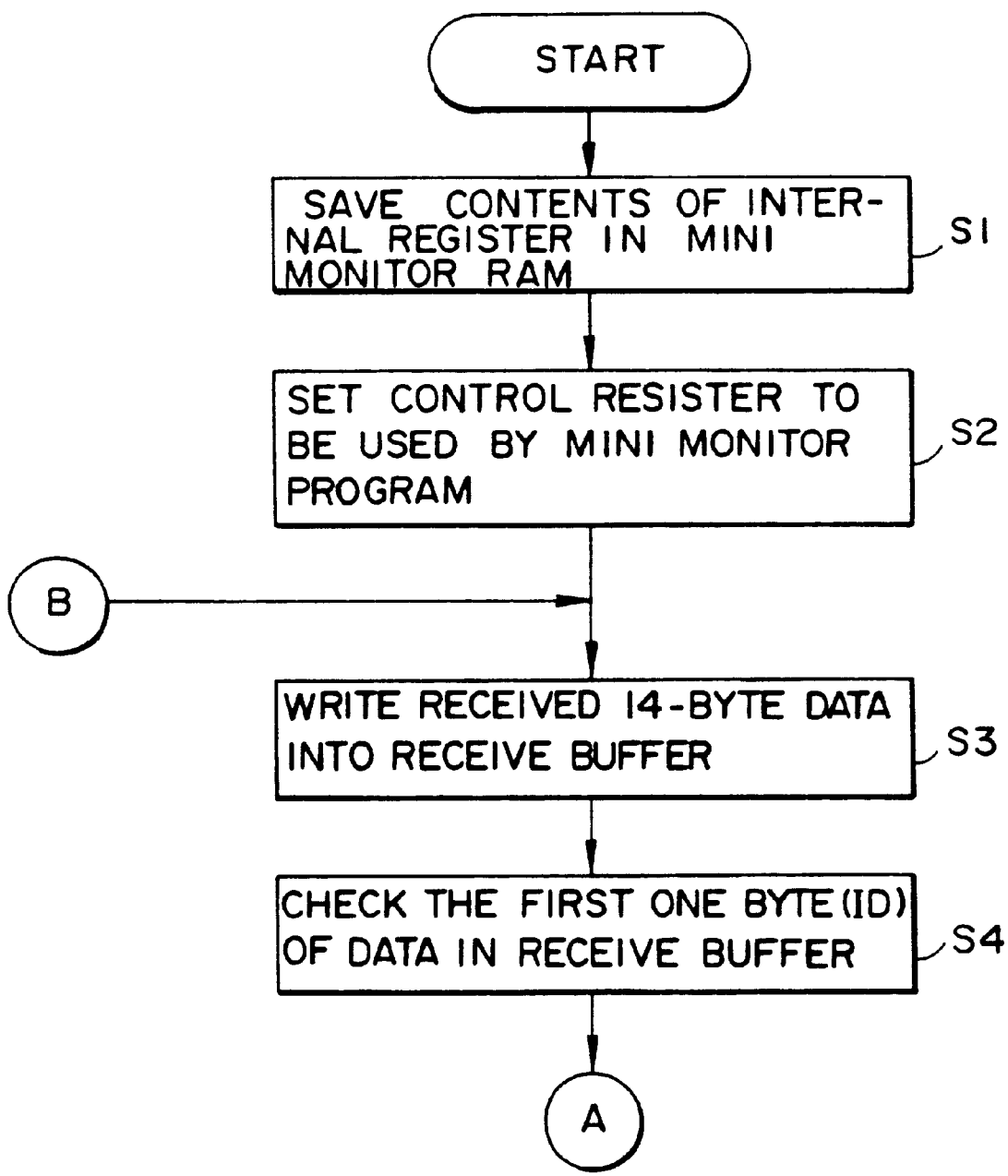
FIG. 13 is a flowchart illustrating an example of a detailed process according to the embodiment of the present invention.
Figure 14:
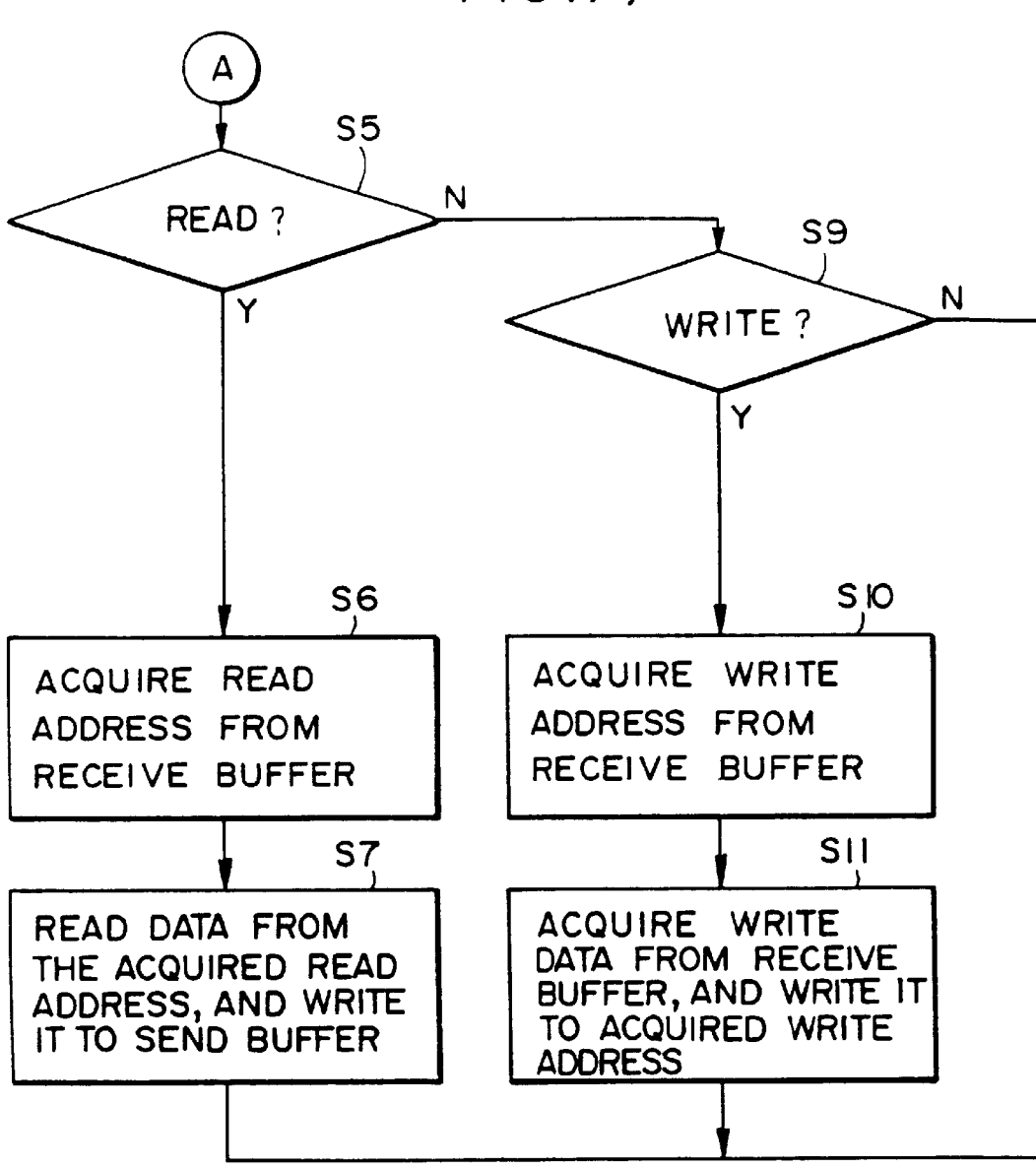
FIG. 14 is a flowchart illustrating an example of another detailed process according to the embodiment of the present invention.

FIGS. 13 and 14 shows flowcharts for illustrating the process of the mini monitor program in the debugging mode.

As shifted to the debugging mode, the mini monitor program first saves the contents in the internal register 24 of the CPU 22 shown in FIG. 3 in the mini monitor RAM 44 (step S1). The mini monitor program then sets the control register 46 which is used by the mini monitor program (step S2).

14 byte-data from the debugging tool 60 (see FIG. 10A) is written into the receive buffer 74 (see FIG. 6) (step S3). Thereafter, the first one byte (command identifying data ID) of the data in the receive buffer 74 is checked (step S4).

If ID represents a read command (see FIG. 10D), the mini monitor program acquires a read address from the receive buffer 74, as shown in FIG. 14 (steps S5 and S6). Data is then read out through the acquired read address and written into the send buffer 72 (step S7). Subsequently, the data is sent from the send buffer 72 to the debugging tool 60 (step S8). The procedure then returns to the step S3 of FIG. 13 wherein the next receive data will be written into the receive buffer 74.

If ID represents a write command (see FIG. 10C), the mini monitor program acquires a write address from the receive buffer 74 (steps S9 and S10). Write data is then acquired from the receive buffer 74 and written into the write address acquired in the step S10 (step S11).

If ID represents an external routine jump command (see FIG. 11A), the program acquires a routine address from the receive buffer 74 (steps S12 and S13). The procedure jumps to the external routine and then returns to the mini monitor program (step S14).

If ID represents a GO command (see FIG. 11B), the data saved in the mini monitor RAM 44 is restored into the internal register 24 (steps S15 and S16). As shown in FIG. 12, the procedure then returns to the user program, and the debugging mode is ended (step S17).

On the other hand, if ID is neither of read, write, external routine jump or GO command, it is judged that no process is required (steps S15 and S18). Dummy data is then written into the send buffer 72 (step S19). The processing of data fill command is omitted in FIG. 14.

In such a manner, primitive commands obtained by conversion of debugging commands will be executed by the mini monitor program.

9. Detailed Processing of External Routine Jump

The details of an external routine jump processing will now be described with reference to the flowcharts of FIGS. 19 and 20.

As already described in connection with the steps S4 and S12 of FIGS. 13 and 14, the first one byte (ID) of the data in the receive buffer 74 is first checked. If ID represents anything other than an external routine jump command, the procedure shifts to any other command process (steps U1, U2 and U3). On the other hand, if ID represents an external routine jump command, the procedure acquires a routine address from the receive buffer 74 (see FIG. 1A), the routine address being then written into an internal register R12 (see the internal register 24 of FIG. 3) (step U4). Similarly, the procedure acquires write address and data address from the receive buffer 74, and they are respectively written into internal registers R13 and R14 (steps U5 and U6). A return address is then written into an internal register R15 (step U7). An instruction of jump to the routine address written into the internal register R12 is then executed (step U8). This causes an external routine such as the writing program for the flash memory 38 of FIG. 3 to be executed.

The contents of the internal register 24 has already been saved into the mini monitor RAM 44 at the step S1 of FIG. 13. Therefore, no problem will be raised even if the routine address, write data, data address and return address are written into the internal registers R12, R13, R14 and R15 as described.

Figure 19:
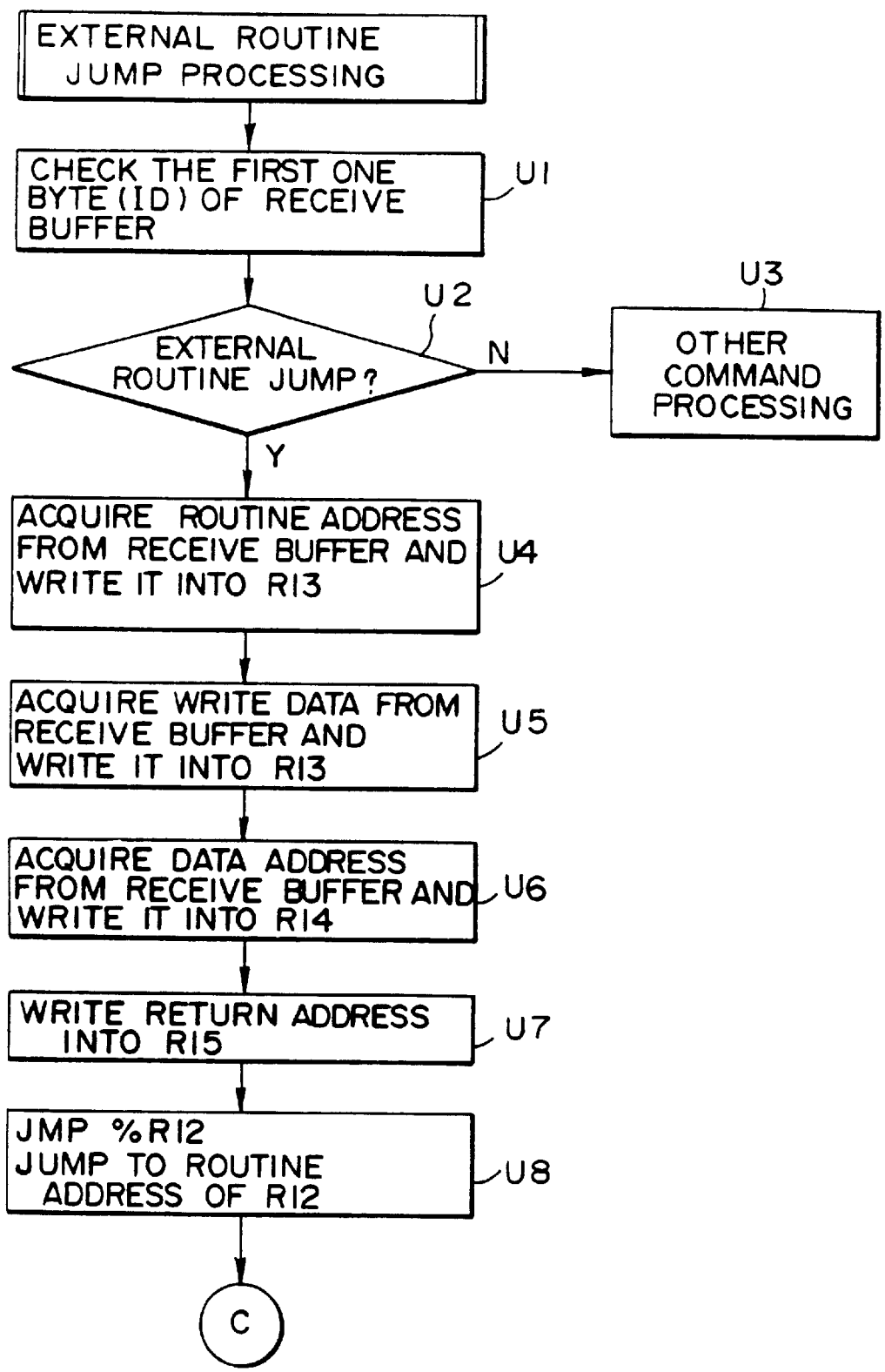
FIG. 19 is a flowchart illustrating the details of the external routine jumping process.
Figure 20:
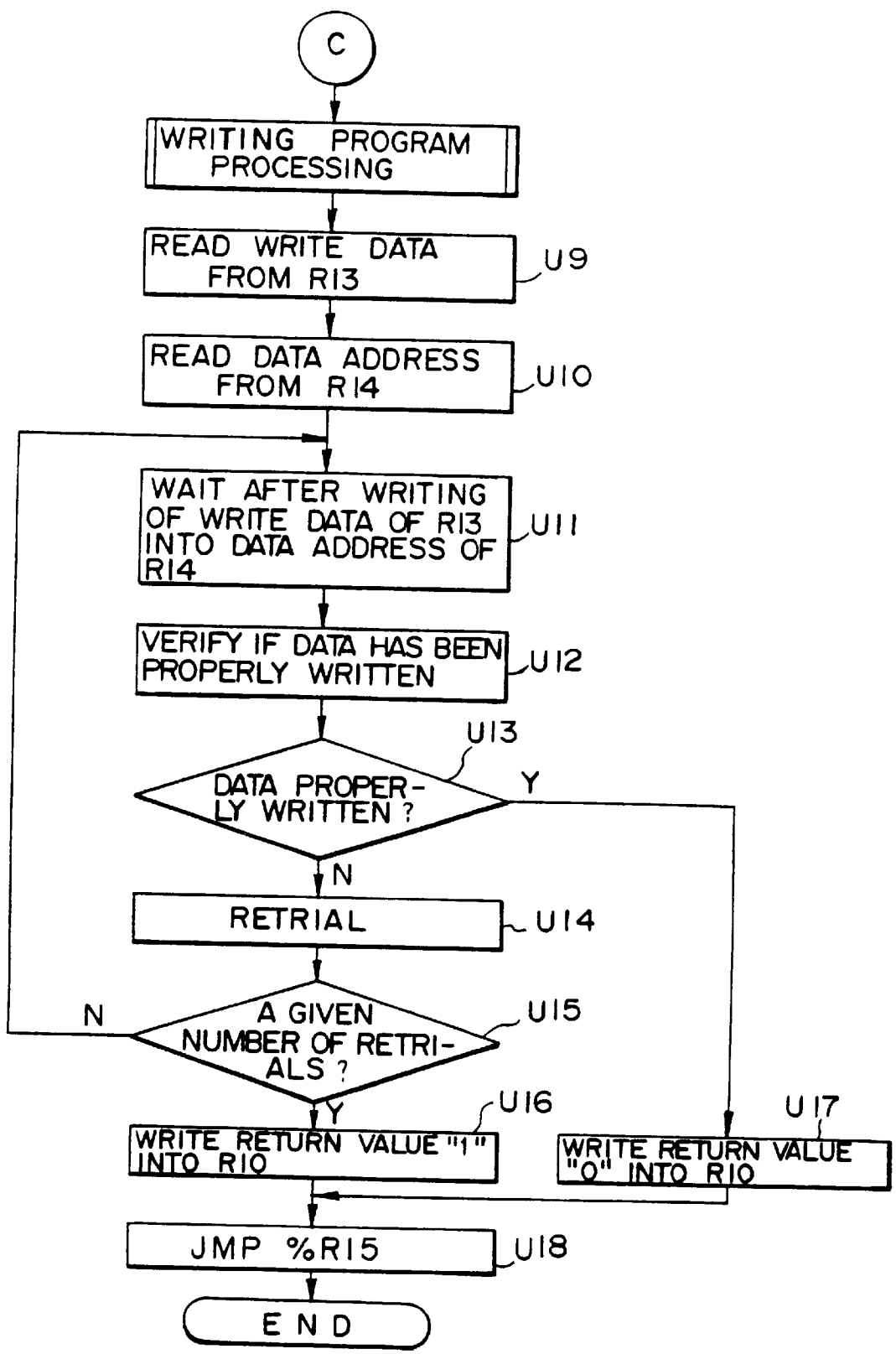
FIG. 20 is a flowchart illustrating a detailed process of a writing program which is an external routine.

When the procedure shifts to the writing program as shown in FIG. 20, the writing program reads out the write data written into the internal register R13 at the step U5 of FIG. 19 (step U9) and then reads out the data address written into the internal register R14 at the step U6 (step U10). The write data obtained at the step U9 is written into the data address obtained at the step U10, and then the procedure shifts to the wait state (step U11).

The writing program then verifies whether or not data has properly been written into the flash memory 38 (step U12). If the data has not properly been written into the flash memory 38, a given number of trials are repeated (steps U13, U14 and U15).

If the given number of trials cannot properly write the data into the flash memory 38, the program writes "one" into the internal register R10 as a return value (see the send data of FIG. 11A) (step U16). On the other hand, if it is judged that the data is properly written into the flash memory 38 at the step U13, the program writes "zero" into the internal register R10 as a return value (step U17). This return value (or error flag) is then transmitted to the main monitor section 62. In such a manner, the main monitor section 62 can know whether or not the data has properly been written into the flash memory 38 by checking the return value.

Finally, the procedure jumps to the return address written into the internal register R15 at the step U7 of FIG. 19 (step U18). Thus, the procedure will again return from the writing program to the mini monitor program.

By repeatedly executing the writing program as described or by sending data instructing the external routine jump command from the main monitor section 62 plural times, the user program can be written into the flash memory 38 or the user program already stored in the flash memory 38 can be rewritten.

10. Electronic Equipment

The description now turns to electronic equipment comprising the microcomputer (information processing device) of this invention.

Figure 22A:
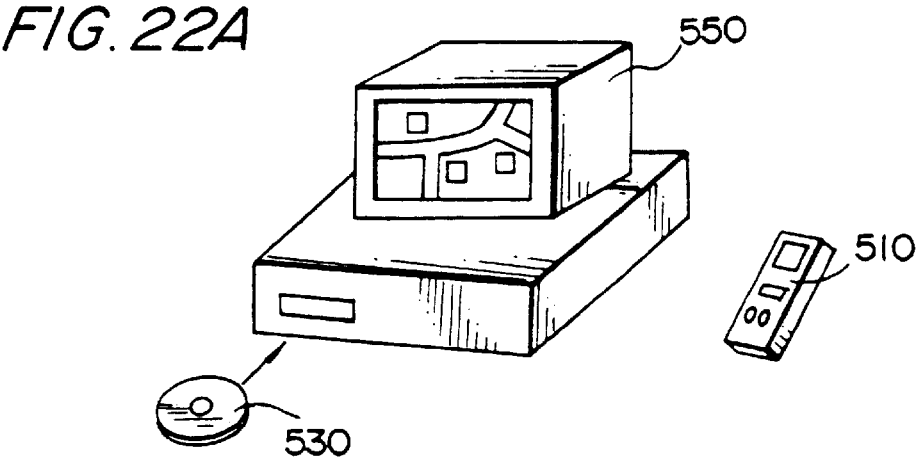
FIGS. 22A to 22C illustrate external views of the electronic equipment.

An internal block diagram of a car navigation system that is one example of such electronic equipment is shown in FIG. 21A and an external view thereof is shown in FIG. 22A. A remote controller 510 is used to operate this car navigation system and the position of the vehicle is detected by a position detection section 520 on the basis of information from GPS or gyroscope. Maps and other information are stored in a CD-ROM 530 (information storage medium). An image memory 540 functions as a work area during image processing, and the thus generated images are displayed to the driver by an image output section 550. A microcomputer 500 inputs data from data input sources such as the remote controller 510, the position detection section 520, and the CD-ROM 530, performs various operations thereon, then uses an output device such as the image output section 550 to output the data after the processing.

Figure 22B:
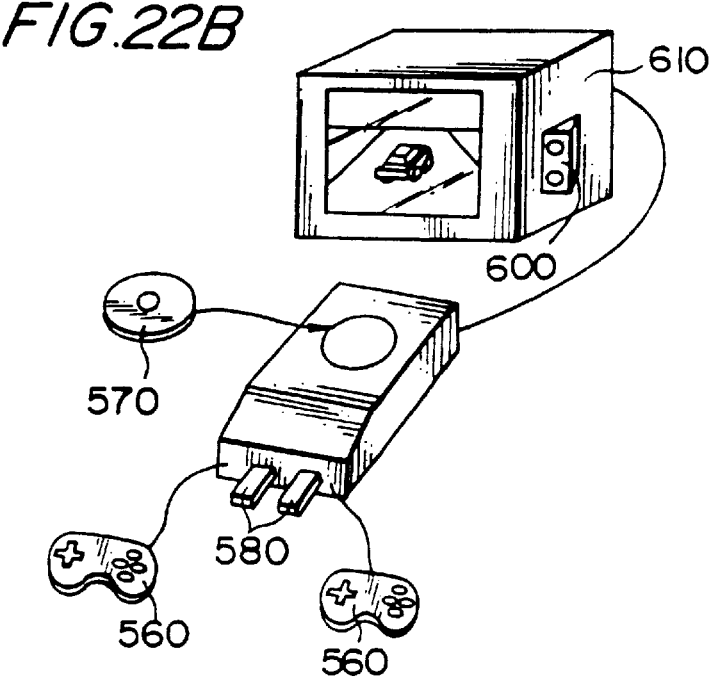

An internal block diagram of a game machine that is another example of such electronic equipment is shown in FIG. 21B and an external view thereof is shown in FIG. 22B. Using an image memory 590 as a work area, this game machine generates game images and sounds based on the player's operating information from a game controller 560, a game program from a CD-ROM 570, and player information from an IC card 580, and outputs them by using an image output section 610 and a sound output section 600.

Figure 22C:
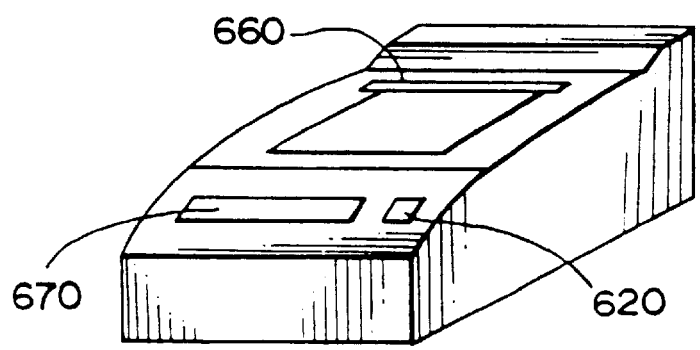

An internal block diagram of a printer that is a further example of such electronic equipment is shown in FIG. 21C and an external view thereof is shown in FIG. 22C. Using a bit map memory 650 as a work area, this printer creates print images based on operating information from an operating panel 620 and character information from a code memory 630 and a font memory 640, and outputs them by using a print output section 660. A display panel 670 is used for conveying the current state and mode of the printer to the user.

The microcomputer or debugging system in accordance with this invention makes it possible to simplify the development and reduce the development time of user programs that cause the operation of the items of electronic equipment shown in FIGS. 21A to 22C. Particularly, according to the microcomputer or debugging tool of this embodiment, both the user program debugging and rewriting operations can be performed on the single host system. Therefore, development time of user program can greatly be reduced. Since it also makes it possible to debug user programs in an environment that is the same as that in which the microcomputer operates, the reliability of this electronic equipment is also increased. The hardware of the microcomputer installed into this electronic equipment can be made more compact and less expensive, leading to a reduction of the cost of the electronic equipment itself. Since the instruction code size of the mini monitor program is also small, the memory area used by the user for storing programs and data can be completely untouched thereby.

The electronic equipment to which the microcomputer of this embodiment can be applied is not limited to those described in the above embodiments, and thus it could be any of a portable telephone (cellular-phone), a PHS, a pager, audio equipment, an electronic notebook, an electronic desk-top calculator, a POS terminal, a device provided with a touch-panel, a projector, a dedicated word processor, a personal computer, a television set, or a view-finder or direct monitor type of video tape recorder, by way of example.

The present invention is not limited to the illustrated embodiment, but may be carried out in any of various other forms without departing from the scope of the invention.

For example, the present invention is not limited to the illustrated embodiment in which the monitor section is divided into the mini monitor section and the main monitor section.

Although the illustrated embodiment has been described as to the flash memory used as a given memory, the present invention may similarly be applied to any of various memories other than the flash memory. The memory control program is not limited to include the initializing and writing programs.

The structure of the microcomputer or mini monitor section (or first monitor means) is not also limited to that of the illustrated embodiment, but may be carried out in any of various forms.

The structure of the debugging system is not limited to that of FIG. 7.

What is claimed is:

1. A microcomputer having an on-chip debugging function, comprising:
   a central processing unit for executing instructions;
   a memory which stores a memory control program for a given memory; and
   first monitor means for performing data transfer to and from a debugging tool provided outside of the microcomputer, performing debugging processing and also performing processing for execution of a jump command to an address of a region at which the memory control program for the given memory is stored, based on the receive data from the debugging tool, the first monitor means including a memory for storing a monitor program,
   wherein the given memory is a non-volatile memory in which data can be electrically erased and written; and
   wherein the memory control program includes an initializing program and a writing program for the non-volatile memory.

2. The microcomputer as defined in claim 1,
   wherein the receive data contains a routine address at which the memory control program is stored, a write data to be written into the given memory and a data address at which the write data is written.

3. The microcomputer as defined in claim 1,
   wherein data to be sent from the first monitor means to the debugging tool contains a flag for announcing an error in the writing of data into the memory.

4. The microcomputer as defined in claim 1,
   wherein the debugging tool includes a second monitor means for converting a debugging command into at least one primitive command; and
   wherein the first monitor means determines a primitive command to be executed based on receive data from the second monitor means and performs processing for execution of the determined primitive command.

5. The microcomputer as defined in claim 4,
   wherein the primitive command includes a jump command to an address at which the memory control program is stored, a command for starting execution of a user program, a command for writing data into an address on a memory map in debugging mode and a command for reading data from the address on the memory map.

6. The microcomputer as defined in claim 5,
   wherein the receive data from the second monitor means contains data used to identify a primitive command to be executed by the first monitor means.

7. The microcomputer as defined in claim 4,
   wherein the receive data from the second monitor means contains data used to identify a primitive command to be executed by the first monitor means.

8. A microcomputer having an on-chip debugging function, comprising:
   a central processing unit for executing instructions;
   a memory which stores a memory control program for a given memory; and
   first monitor means for performing data transfer to and from a debugging tool provided outside of the microcomputer, performing debugging processing and also performing processing for execution of a jump command to an address of a region at which the memory control program for the given memory is stored, based on the receive data from the debugging tool, the first monitor means including a memory for storing a monitor program,
   wherein the receive data contains a routine address at which the memory control program is stored, a write data to be written into the given memory and a data address at which the write data is written.

9. A microcomputer having an on-chip debugging function, comprising:

a central processing unit for executing instructions;

a memory which stores a memory control program for a given memory; and first monitor means for performing data transfer to and from a debugging tool provided outside of the microcomputer, performing debugging processing and also performing processing for execution of a jump command to an address of a region at which the memory control program for the given memory is stored, based on the receive data from the debugging tool, the first monitor means including a memory for storing a monitor program, wherein the debugging tool includes second monitor means for converting a debugging command into at least one primitive command; and wherein the first monitor means determines a primitive command to be executed based on receive data from the second monitor means and performs processing for execution of the determined primitive command.

10. The microcomputer as defined in claims 9, wherein the primitive command includes a jump command to an address at which the memory control program is stored, a command for starting execution of a user program, a command for writing data into an address on a memory map in debugging mode and a command for reading data from the address on the memory map.

11. The microcomputer as defined in claim 10, wherein the receive data from the second monitor means contains data used to identify a primitive command to be executed by the first monitor means.

12. The microcomputer as defined in claim 9, wherein the receive data from the second monitor means contains data used to identify a primitive command to be executed by the first monitor means.

13. Electronic equipment comprising:

a microcomputer as defined in claim 1;

an input source of data to be processed by the microcomputer; and an output device for outputting data processed by the microcomputer.

14. Electronic equipment comprising:

a microcomputer as defined in claim 8;

an input source of data to be processed by the microcomputer; and an output device for outputting data processed by the microcomputer.

15. Electronic equipment comprising:

a microcomputer as defined in claims 9;

an input source of data to be processed by the microcomputer; and an output device for outputting data processed by the microcomputer.

16. Electronic equipment comprising:

a microcomputer as defined in claim 10;

an input source of data to be processed by the microcomputer; and an output device for outputting data processed by the microcomputer.

17. Electronic equipment comprising:

a microcomputer as defined in claim 12;

an input source of data to be processed by the microcomputer; and an output device for outputting data processed by the microcomputer.

18. A microcomputer having an on-chip debugging function, comprising:

a central processing unit which executes instructions; and a first monitor section which performs data transfer to and from a debugging tool provided outside of the microcomputer, and performs debugging processing and processing for execution of a jump command to an address of a region at which a memory control program for a given memory is stored, based on the receive data from the debugging tool;

wherein the first monitor section comprises:

a monitor memory which stores a monitor program;

a control register which controls the debugging processing; and a data transfer circuit which transfers data to and from the debugging tool, wherein the given memory is a non-volatile memory in which data can be electrically erased and written; and wherein the memory control program includes an initializing program and a writing program for the non-volatile memory.

19. The microcomputer as defined in claim 18, wherein data to be sent from the first monitor section to the debugging tool contains a flag for announcing an error in the writing of data into the memory.

20. A microcomputer having an on-chip debugging function, comprising:

a central processing unit which executes instructions; and a first monitor section which performs data transfer to and from a debugging tool provided outside of the microcomputer, and performs debugging processing and processing for execution of a jump command to an address of a region at which a memory control program for a given memory is stored, based on the receive data from the debugging tool;

wherein the first monitor section comprises:

a monitor memory which stores a monitor program;

a control register which controls the debugging processing; and a data transfer circuit which transfers data to and from the debugging tool, wherein the receive data contains a routine address at which the memory control program is stored, a write data to be written into the given memory and a data address at which the write data is written.

21. The microcomputer as defined in claim 20, wherein data to be sent from the first monitor section to the debugging tool contains a flag for announcing an error in the writing of data into the memory.

22. A microcomputer having an on-chip debugging function, comprising:

a central processing unit which executes instructions; and a first monitor section which performs data transfer to and from a debugging tool provided outside of the microcomputer, and performs debugging processing and processing for execution of a jump command to an address of a region at which a memory control program for a given memory is stored, based on the receive data from the debugging tool;

wherein the first monitor section comprises:

a monitor memory which stores a monitor program;

a control register which controls the debugging processing; and data transfer circuit which transfers data to and from the debugging tool, wherein the debugging tool includes second monitor section which converts a debugging command into at least one primitive command; and wherein the first monitor section determines a primitive command to be executed based on receive data from the second monitor section and performs processing for execution of the determined primitive command.

23. The microcomputer as defined in claim 22, wherein the primitive command includes a jump command to an address at which the memory control program is stored, a command for starting execution of a user program, a command for writing data into an address on a memory map in debugging mode and a command for reading data from the address on the memory map.

24. The microcomputer as defined in claim 22, wherein the receive data from the second monitor section contains data used to identify a primitive command to be executed by the first monitor section.

25. The microcomputer as defined in claim 22, wherein data to be sent from the first monitor section to the debugging tool contains a flag for announcing an error in the writing of data into the memory.

26. Electronic equipment comprising:

a microcomputer as defined in claim 18;

an input source of data to be processed by the microcomputer; and an output device for outputting data processed by the microcomputer.

27. A debugging system for a target system including a microcomputer, comprising:

a debugging tool provided outside of the microcomputer; and a first monitor section which performs data transfer to and from the debugging tool, and performs debugging processing and processing for execution of a jump command to an address of a region at which a memory control program for a given memory is stored, based on the receive data from the debugging tool;

wherein the first monitor section comprises:

a monitor memory which stores a monitor program;

a control register which controls the debugging processing; and a data transfer circuit which transfers data to and from the debugging tool, wherein the given memory is a non-volatile memory in which data can be electrically erased and written; and wherein the memory control program includes an initializing program and a writing program for the non-volatile memory.

28. The debugging system as defined in claim 27, wherein data to be sent from the first monitor section to the debugging tool contains a flag for announcing an error in the writing of data into the memory.

29. A debugging system for a target system including a microcomputer, comprising:

a debugging tool provided outside of the microcomputer; and a first monitor section which performs data transfer to and from the debugging tool, and performs debugging processing and processing for execution of a jump command to an address of a region at which a memory control program for a given memory is stored, based on the receive data from the debugging tool;

wherein the first monitor section comprises:

a monitor memory which stores a monitor program;

a control register which controls the debugging processing; and a data transfer circuit which transfers data to and from the debugging tool, wherein the receive data contains a routine address at which the memory control program is stored, a write data to be written into the given memory and a data address at which the write data is written.

30. The debugging system as defined in claim 29, wherein data to be sent from the first monitor section to the debugging tool contains a flag for announcing an error in the writing of data into the memory.

31. A debugging system for a target system including a microcomputer, comprising:

a debugging tool provided outside of the microcomputer; and a first monitor section which performs data transfer to and from the debugging tool, and performs debugging processing and processing for execution of a jump command to an address of a region at which a memory control program for a given memory is stored, based on the receive data from the debugging tool;

wherein the first monitor section comprises:

a monitor memory which stores a monitor program;

a control register which controls the debugging processing; and a data transfer circuit which transfers data to and from the debugging tool, wherein the debugging tool includes second monitor section which converts a debugging command into at least one primitive command; and wherein the first monitor section determines a primitive command to be executed based on receive data from the second monitor section and performs processing for execution of the determined primitive command.

32. The debugging system as defined in claim 31, wherein the primitive command includes a jump command to an address at which the memory control program is stored, a command for starting execution of a user program, a command for writing data into an address on a memory map in debugging mode and a command for reading data from the address on the memory map.

33. The debugging system as defined in claim 31, wherein the receive data from the second monitor section contains data used to identify a primitive command to be executed by the first monitor section.

34. Electronic equipment comprising:

a microcomputer as defined in claim 20;

an input source of data to be processed by the microcomputer; and an output device for outputting data processed by the microcomputer.

35. Electronic equipment comprising:

a microcomputer as defined in claim 22;

an input source of data to be processed by the microcomputer; and an output device for outputting data processed by the microcomputer.

* * * * *